(12) United States Patent
Kim

(10) Patent No.: US 11,941,417 B1
(45) Date of Patent: Mar. 26, 2024

(54) METHOD FOR PRODUCING PROTOTYPE OF GRAPHICAL USER INTERFACE AND SYSTEM THEREOF

(71) Applicant: STUDIO XID KOREA, INC., Seoul (KR)

(72) Inventor: Soo Kim, Hwaseong-si (KR)

(73) Assignee: STUDIO XID KOREA, INC., Seoul (KR)

( * ) Notice: Subject to any disclaimer, the term of this patent is extended or adjusted under 35 U.S.C. 154(b) by 0 days.

(21) Appl. No.: 18/313,153

(22) Filed: May 5, 2023

(30) Foreign Application Priority Data

Mar. 8, 2023 (KR) ........................ 10-2023-0030366

(51) Int. Cl.
G06F 9/451 (2018.01)

(52) U.S. Cl.
CPC .................................. G06F 9/451 (2018.02)

(58) Field of Classification Search
CPC ....................................................... G06F 9/451
See application file for complete search history.

(56) References Cited

U.S. PATENT DOCUMENTS

| | | | |
|---|---|---|---|
| 2011/0047488 A1* | 2/2011 | Butin | G06F 3/04842 715/762 |
| 2012/0174000 A1* | 7/2012 | Zavatone | G06F 8/38 715/763 |
| 2013/0096817 A1* | 4/2013 | Fauci | H04W 4/027 701/410 |
| 2018/0203674 A1* | 7/2018 | Dayanandan | G06F 8/35 |
| 2019/0250891 A1* | 8/2019 | Kumar | G06F 18/2411 |
| 2019/0317739 A1* | 10/2019 | Turek | G06N 3/045 |
| 2021/0191543 A1* | 6/2021 | Kim | G06F 3/0488 |
| 2022/0161145 A1* | 5/2022 | Hardee | G11B 27/34 |
| 2022/0334853 A1* | 10/2022 | Prakash | G06F 8/76 |

FOREIGN PATENT DOCUMENTS

| | | |
|---|---|---|
| KR | 10-1426918 B1 | 8/2014 |
| KR | 10-1594946 B1 | 2/2016 |
| KR | 10-1640377 B1 | 7/2016 |
| KR | 10-2017-0129598 A | 11/2017 |
| KR | 10-2213291 B1 | 2/2021 |

OTHER PUBLICATIONS

An Office Action; mailed by the Korean Intellectual Property Office dated Apr. 17, 2023, which corresponds to Korean Patent Application No. 10-2023-0030366.

* cited by examiner

*Primary Examiner* — Daniel W Parcher
(74) *Attorney, Agent, or Firm* — Studebaker & Brackett PC

(57) ABSTRACT

A method for producing a prototype of a graphical user interface (GUI) and a system thereof are provided. The method according to some embodiments of the present disclosure includes providing a prototype producing interface to a user, determining a target object from among one or more objects disposed on a target graphical user interface (GUI) screen produced through the prototype producing interface, determining a recommended motion for the target object using pre-produced GUI screen samples, wherein the GUI screen samples include motion objects, and providing the recommended motion to the user.

18 Claims, 31 Drawing Sheets

FIG. 18
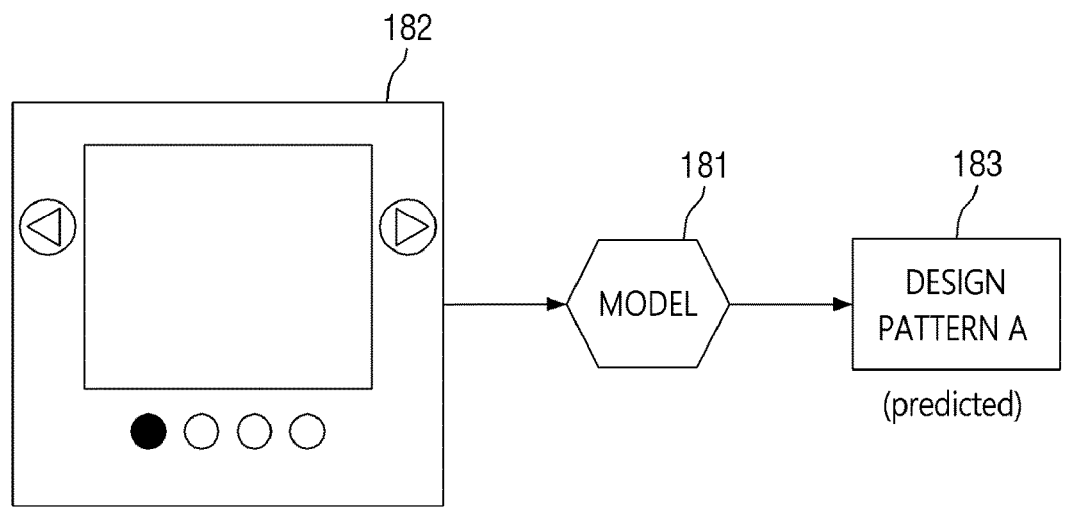
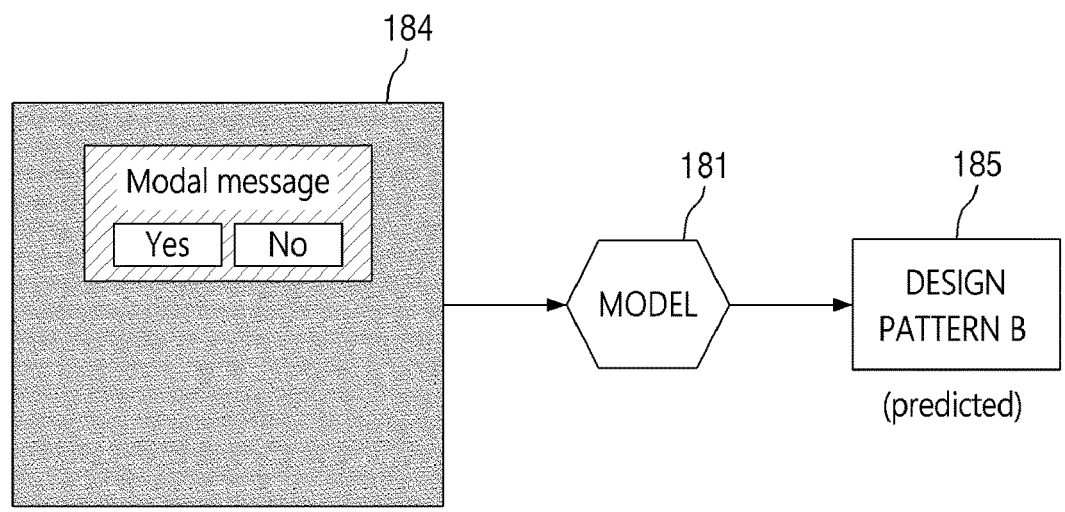

METHOD FOR PRODUCING PROTOTYPE OF GRAPHICAL USER INTERFACE AND SYSTEM THEREOF

CROSS-REFERENCE TO RELATED APPLICATION

This application claims priority from Korean Patent Application No. 10-2023-0030366 filed on Mar. 8, 2023 in the Korean Intellectual Property Office, and all the benefits accruing therefrom under 35 U.S.C. 119, the contents of which in its entirety are herein incorporated by reference.

BACKGROUND

1. Technical Field

The present disclosure relates to a method for producing a prototype of a graphical user interface and a system thereof, and more particularly, to a method for supporting a production of a prototype of a graphical user interface using machine-learning techniques and a system for performing the method.

2. Description of the Related Art

Terminal manufacturers, application manufacturers, and online service providers are putting a lot of effort into a design of a graphical user interface (hereinafter, refer to as 'GUI') to increase use convenience of products (or services). In addition, in a process of designing such a GUI, various tools for producing a prototype of the GUI are used.

Designers may check user convenience, user interaction, and various visual effects through the prototype of the GUI before applying the GUI to terminals, applications, or online services (hereinafter collectively referred to as 'applications'). In addition, the designers may share the prototype of the GUI with third parties, such as application planners and developers, to exchange opinions with each other.

On the other hand, most of the designers currently feel a lot of difficulty in describing object motion suitable for a GUI screen, or spend a considerable amount of time to determine a motion of an object that effectively represents a desired image (or their design intent). In fact, it is not easy even for an experienced designer to specifically describe or quickly come up with a motion of an object suitable for a specific GUI screen.

SUMMARY

Aspects of the present disclosure provide a method for improving a production convenience of a prototype of a graphical user interface (hereinafter referred to as 'GUI') and a system for performing the method.

Aspects of the present disclosure also provide a method capable of improving a production quality of a prototype of a GUI and a system for performing the method.

Aspects of the present disclosure also provide a method capable of reducing a production difficulty of a prototype of a GUI and a system for performing the method.

Aspects of the present disclosure also provide a method capable of increasing a production speed of a prototype of a GUI and improving production efficiency thereof, and a system for performing the method.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided a method for producing a prototype of a graphical user interface performed by at least one computing device. The method comprises providing a prototype producing interface to a user, determining a target object from among one or more objects disposed on a target graphical user interface (GUI) screen produced through the prototype producing interface, determining a recommended motion for the target object using pre-produced GUI screen samples, wherein the GUI screen samples include motion objects, and providing the recommended motion to the user.

In some exemplary embodiments, the determining of the target object comprises obtaining a model trained to predict a motion object by receiving GUI screen information, predicting a motion object from among the one or more objects disposed on the target GUI screen through the trained model, and determining the predicted motion object through the trained model as the target object.

In some exemplary embodiments, the determining of the recommended motion for the target object comprises determining a value of a motion element for the recommended motion, and the motion element includes at least one of a destination, a travel time to the destination, a speed, and an acceleration.

In some exemplary embodiments, the determining of the recommended motion for the target object comprises calculating a similarity between the GUI screen samples and the target GUI screen based on attribute information of an object, selecting a reference sample from among the GUI screen samples based on the similarity, and determining the recommended motion using a motion object of the reference sample.

In some exemplary embodiments, the determining of the recommended motion for the target object comprises calculating an embedding similarity between the GUI screen samples and the target GUI screen, selecting a reference sample from among the GUI screen samples based on the embedding similarity, and determining the recommended motion using a motion object of the reference sample.

In some exemplary embodiments, the determining of the recommended motion for the target object comprises obtaining a trained model using the GUI screen samples, wherein the model is trained to predict a motion of an object by receiving information of the GUI screen samples, and predicting the recommended motion by inputting information of the target GUI screen to the trained model.

In some exemplary embodiments, the determining of the recommended motion for the target object comprises selecting a reference sample from among the GUI screen samples based on a task or a design pattern of the target GUI screen, and determining the recommended motion using a motion object of the reference sample.

In some exemplary embodiments, the determining of the recommended motion for the target object comprises receiving a motion description of the target object from the user, extracting a user's design intention from the motion description, obtaining a trained model using the GUI screen samples, wherein the model is trained to predict a motion of an object by receiving a design intention of the GUI screen samples, and predicting a recommended motion of the target object that meets the user's design intention through the trained model.

In some exemplary embodiments, the method further comprises obtaining a rule set for determining a motion based on an attribute of an object, and determining another recommended motion by applying the rule set to attribute information of the target object.

In some exemplary embodiments, the determining of the recommended motion for the target object comprises determining a value of a motion element of the target object using motion objects of the GUI screen samples, and determining the recommended motion by correcting the value of the motion element based on attribute information of the target object.

In some exemplary embodiments, the method further comprises obtaining a rule set for determining a motion based on a relationship between objects, extracting relationship information between the target object and another object disposed on the target GUI screen by analyzing the target GUI screen, and determining another recommended motion by applying the rule set to the extracted relationship information.

In some exemplary embodiments, the method further comprises obtaining another GUI screen associated with the target GUI screen, wherein a change in display attribute exists between the another GUI screen and the target GUI screen, identifying a type and degree of change of the display attribute by comparing the target GUI screen with the another GUI screens, and determining another recommended motion of the target object based on the identification result.

In some exemplary embodiments, wherein the providing of the recommended motion to the user comprises displaying an image of the recommended motion through a preview window, displaying a value of a motion element for the recommended motion, and updating the image of the recommended motion by reflecting the changed value in response to a user's input for changing the value of the motion element.

According to another aspect of the present disclosure, there is provided a system for producing a prototype of a graphical user interface. The system comprises one or more processors, and a memory for storing instructions, wherein the one or more processors perform operations of by executing the stored instructions, providing a prototype producing interface to a user, determining a target object from among one or more objects disposed on a graphical user interface (GUI) screen produced through the prototype producing interface, determining a recommended motion for the target object using pre-produced GUI screen samples, and providing the recommended motion to the user.

According to yet another aspect of the present disclosure, there is provided a non-transitory computer-readable recording medium comprising instructions executable by a processor of a computing device, wherein the instructions, when executed by the processor of the computing device, cause the computing device to perform operations comprising providing a prototype producing interface to a user, determining a target object from among one or more objects disposed on a target graphical user interface (GUI) screen produced through the prototype producing interface, determining a recommended motion for the target object using pre-produced GUI screen samples, wherein the GUI screen samples include motion objects, and providing the recommended motion to the user.

According to some exemplary embodiments of the present disclosure, a recommended motion for a target object disposed on a graphical user interface (hereinafter referred to as 'GUI') screen being produced may be provided to a user (e.g., a designer). For example, the recommended motion for the target object may be provided to the user by referring to motion objects of samples of pre-produced GUI screen. Accordingly, the production convenience of the prototype of the GUI may be improved and the production difficulty thereof may be greatly reduced. In addition, the cost required for producing the prototype of the GUI may be reduced and the quality of the produced prototype of the GUI may be improved.

In addition, by determining the recommended motion of the target object in consideration of a task and a design pattern of the GUI screen, recommendation accuracy and user satisfaction may be further improved.

In addition, the recommended motion for the target object may be determined by reflecting a motion description input by a user. For example, if a brief description of the motion is given, a recommended motion that meets the given description may be accurately determined using a trained (or learned) model or the like. Accordingly, the production convenience of the prototype of the GUI may be further improved and the production difficulty thereof may be further reduced.

In addition, a natural motion suitable for a situation may be determined as the recommended motion of the target object by considering a relationship between attribute information of the target object and other objects (e.g., a case in which a high-speed motion is recommended for a target object having a large size may be prevented).

In addition, a natural motion suitable for a situation may be determined as the recommended motion of the target object by taking into account changes in display attributes of the target object or other objects (e.g., a case in which a low-speed motion is recommended for a target object having a large size change may be prevented).

Effects according to the technical idea of the present disclosure are not limited to the effects mentioned above, and other effects that are not mentioned may be obviously understood by those skilled in the art from the following description.

BRIEF DESCRIPTION OF THE DRAWINGS

The above and other aspects and features of the present disclosure will become more apparent by describing in detail exemplary embodiments thereof with reference to the attached drawings, in which:

FIG. 18 is an exemplary diagram for explaining a method for determining a design pattern of a GUI screen using a machine learning model according to some exemplary embodiments of the present disclosure;

DETAILED DESCRIPTION OF THE EMBODIMENTS

Figure 1:
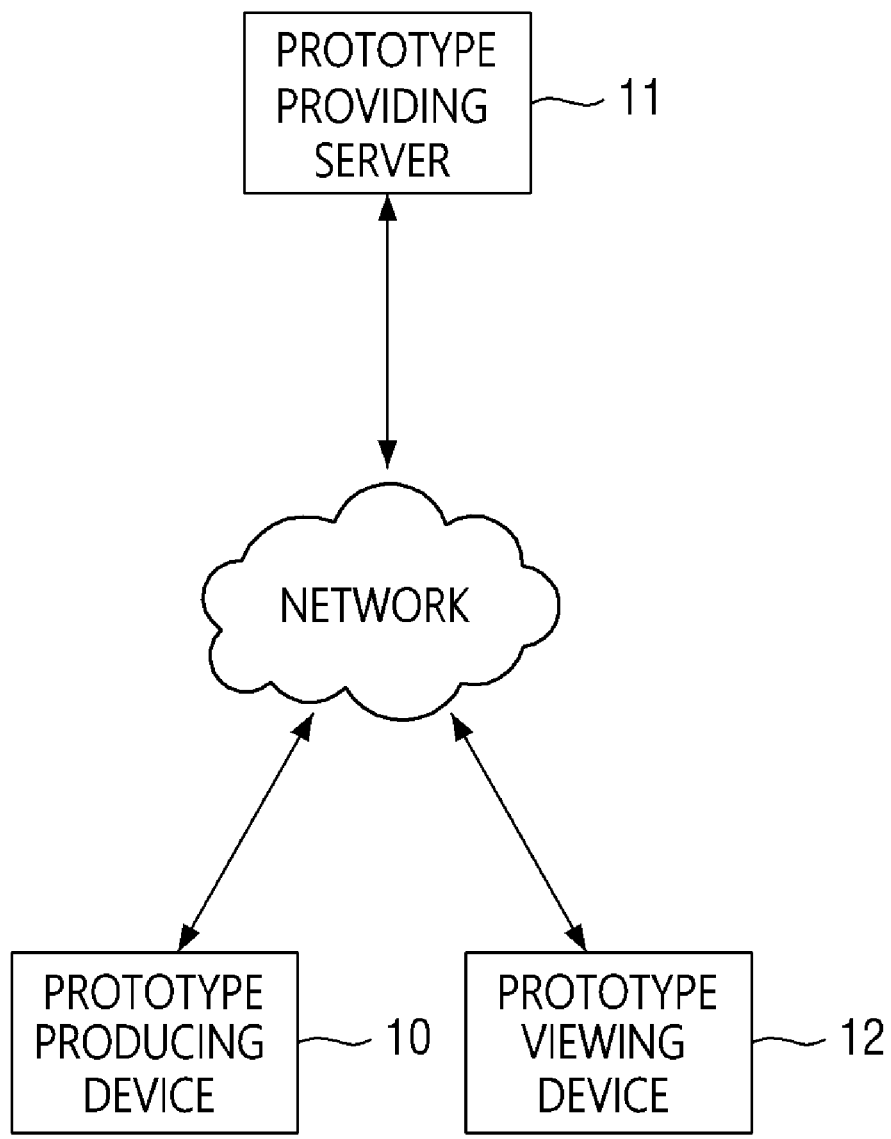
FIG. 1 is an exemplary configuration diagram for explaining an operating environment of a prototype producing device according to some exemplary embodiments of the present disclosure.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Prior to description of various exemplary embodiments of the present disclosure, concepts of terms that may be used in the following exemplary embodiments will be clarified.

In the following exemplary embodiments, 'producer' (or 'builder') or 'author' may refer to a person who makes a prototype of a graphical user interface (hereinafter referred to as 'GUI'), for example, a designer. In addition, a 'producing/authoring device' may refer to a computing device/ system used by a producer to produce a prototype of a GUI. The producing/authoring device may also be named a 'producing/authoring/building/prototyping system' in some cases.

In the following exemplary embodiments, a 'viewer' may refer to a person who receives and views the produced prototype of the GUI, for example, a developer, a planner, and/or a decision maker. In addition, a 'viewing device' may refer to a computing device/system used by a viewer to view a prototype. The viewing device may also be understood as a device that executes the prototype or reproduces or plays an interaction scenario for the prototype. The viewing device may also be the same type of device as a target device where the GUI to be produced is ultimately executed. The viewing device may also be named a 'viewing system' in some cases.

In the following exemplary embodiments, a 'trigger' may refer to an event that causes a visual change on the GUI and/or an arbitrary reaction or feedback of a device in which the GUI is implemented. The trigger may be a user input on the GUI, other external input such as a sensor, or another event occurring on the GUI. The trigger may be an event generated by a touch input or gesture on the touch screen provided in the device to which the GUI is applied, a user input through a device such as a mouse or keyboard, or measurement data of a sensor (e.g., a camera, a microphone, an acceleration sensor, a gyro sensor, a proximity sensor, a geomagnetic sensor, etc.) included in the corresponding device or a sensor (e.g., an illuminance sensor, a temperature sensor, a human body sensor, etc.) providing data to the corresponding device from outside the corresponding device. Meanwhile, the trigger may also be defined to cause different responses according to trigger occurrence conditions.

In the following exemplary embodiments, a 'response' may refer to a reaction (or action) caused by a trigger. For example, the response may be a change in display attributes (e.g., position, size, transparency, color, azimuth, etc.) of objects of the GUI. In this case, an output (or application/execution) of the response may refer to execution of an operation that changes the display attributes of the object. As another example, the response may be a haptic feedback or a sound feedback of the device in which the GUI is implemented. Meanwhile, the response may function as a trigger that causes another response.

In the following exemplary embodiments, an 'interaction set' may refer to a collection of the trigger and the response caused by the trigger.

In the following exemplary embodiments, the 'interaction' may be a term that comprehensively refers to an occurrence of the event detected on the GUI and a series of reactions in response thereto. The graphical user interface may include GUI objects and a series of interactions.

In the following exemplary embodiments, the 'interaction scenario' may refer to data for reproducing at least some of the interactions applied to the prototype of the GUI sequentially or without order.

Hereinafter, various exemplary embodiments of the present disclosure will be described in detail with reference to the accompanying drawings.

FIG. 1 is an exemplary configuration diagram illustrating an operating environment of a prototype producing device 10 according to some exemplary embodiments of the present disclosure.

As illustrated in FIG. 1, the prototype producing device 10 may operate in conjunction with a prototype viewing device 12 and/or a prototype providing server 11. The devices that operate in conjunction may be collectively referred to as a 'prototype producing system', and in some cases, the prototype producing device 10 may also be referred to as a 'prototype producing system'. Hereinafter, for convenience of explanation, the prototype producing device 10 will be abbreviated as a 'producing device 10', and for convenience of understanding, the other devices 11 and 12 will be described first before the producing (or building) device 10.

The prototype providing server 11 may be a computing device/system providing a prototype providing function. For example, the prototype providing server 11 may receive a GUI prototype (e.g., a GUI prototype such as an application) and an interaction scenario from the producing device 10 and provide them to the prototype viewing device 12. The prototype providing server 11 may be any server that transmits/receives and exchanges data through various protocols such as a file server and a web server, but the scope of the present disclosure is not limited thereto.

The prototype providing server 11 may manage and provide pre-produced GUI prototype samples. For example, the prototype providing server 11 may provide a GUI prototype sample in response to requests from the producing device 10 and the prototype viewing device 12. Each GUI prototype sample may include a number of GUI screen samples, where the prototype providing server 11 may classify and manage the GUI prototype samples and the GUI screen samples according to predetermined references (e.g., a task, an intention, an image, a design pattern, etc.). In addition, the prototype providing server 11 may store and manage such samples in a database DB. GUI prototype sample data may include various data related to triggers, responses, and object attributes.

In some cases, the prototype providing server 11 may provide a GUI prototype producing function through a web interface. That is, a user of the producing device 10 may access the prototype providing server 11 through the web interface to produce the GUI prototype.

Next, the prototype viewing device 12 may refer to a computing device/system that provides a viewing or execution function for the GUI prototype. Alternatively, as described above, the prototype viewing device 12 may refer to a computing device/system used by the viewer to view the GUI prototype. In the following exemplary embodiments, 'prototype viewing' and 'prototype execution' may be used in the same meaning. The prototype viewing device 12 may also have a function of reproducing or playing an interaction scenario for the GUI prototype. The prototype viewing device 12 may obtain a prototype and/or an interaction scenario from the producing device 10 or the prototype providing server 11.

The prototype viewing device 12 may also be a device of the same type as a target device to which the GUI to be produced is applied, or may also be a device of a different type from the target device to which the GUI to be produced is applied. When the prototype viewing device 12 is a device of a different type from the target device, the prototype viewing device 12 may display and execute the prototype through a GUI that simulates an environment (e.g., display, etc.) of the target device.

Next, the producing device 10 may refer to a computing device/system that provides a producing function for the GUI prototype. Alternatively, as described above, the producing device 10 may refer to a computing device/system used by a producer to produce the prototype. In the following description, the 'producer' may also be referred to as a 'user' of the producing device 10. And the producing device 10 may be referred to as 'prototyping device/apparatus 10'.

For example, the producing device 10 may provide a user with a producing function by executing a tool (e.g., a prototyping tool) for producing the GUI prototype. However, the scope of the present disclosure is not limited thereto, and the producing device 10 may also provide the GUI prototype producing function to the user (producer) through a web interface. The producing device 10 may also further provide an interaction scenario generation function for the prototype.

The producing device 10 may provide the produced GUI prototype to the prototype providing server 11 or the prototype viewing device 12. The producing device 10 may also be a device of the same type as a target device to which the GUI to be produced is applied, or may also be a device of a different type from the target device to which the GUI to be produced is applied. In a process of producing and/or demonstrating the prototype, the target device may be connected to the producing device 10 by a wired manner or a wireless manner, and may be used to input or define a trigger to be included in the prototype or to check a response caused by the trigger.

Figure 2:
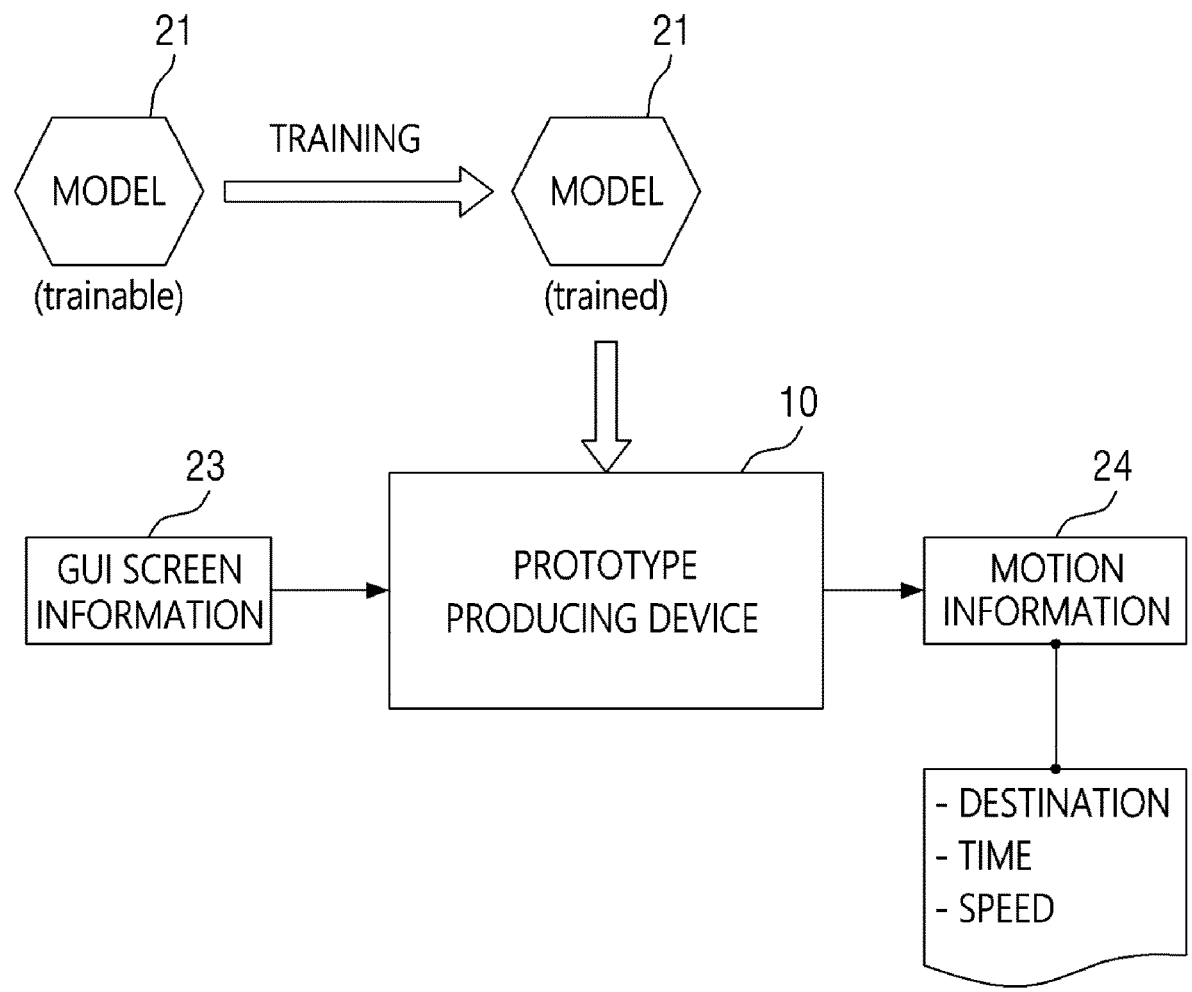
FIGS. 2 and 3 are exemplary diagrams for explaining a process of determining a recommended motion of the prototype producing device according to some exemplary embodiments of the present disclosure.
Figure 3:
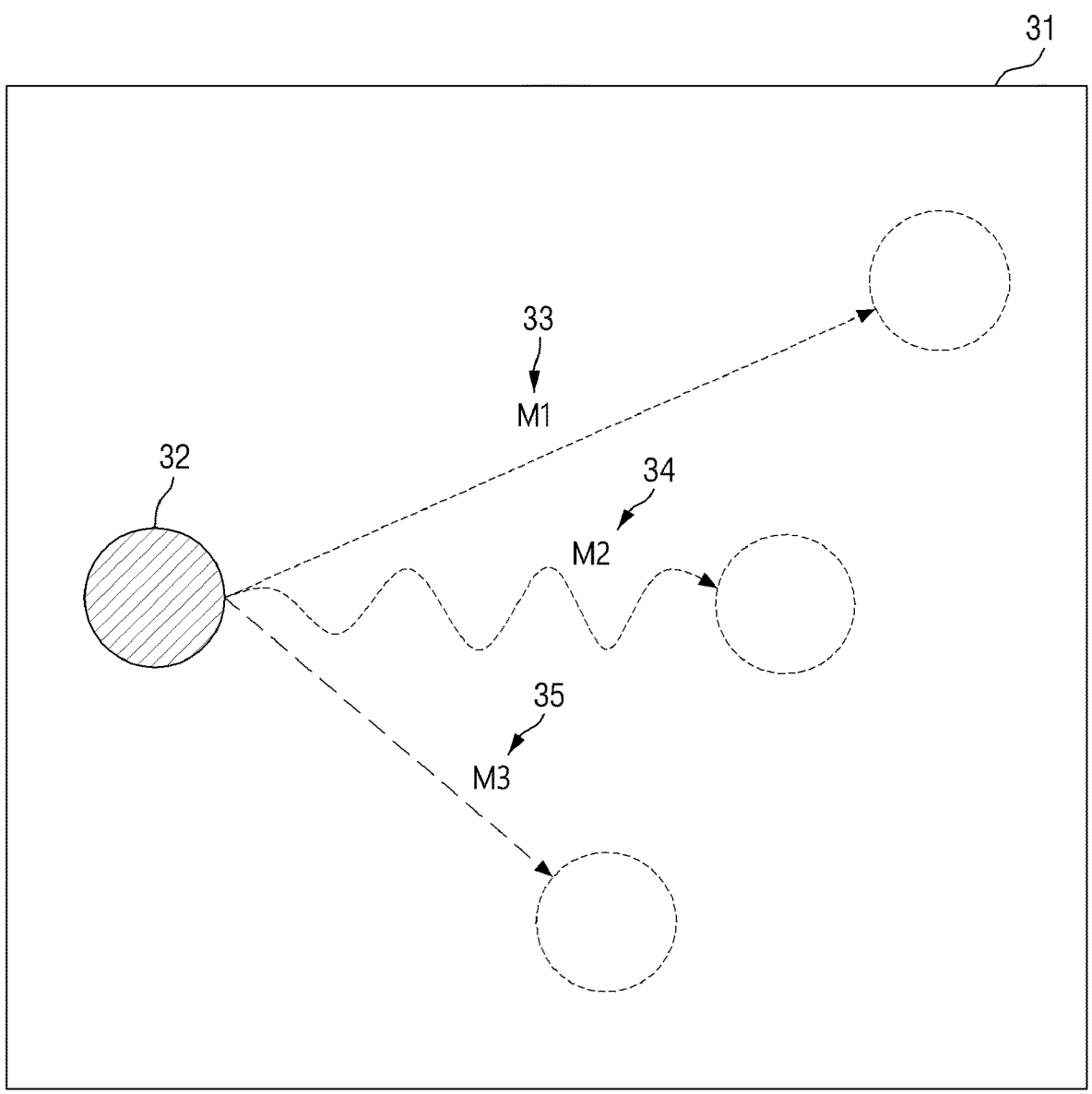

According to various exemplary embodiments of the present disclosure, as illustrated in FIG. 2, the producing device 10 may predict motion information 24 (i.e., recommended motion information) suitable for a target object through a trained model 21 (i.e., a machine learning model) and provide the predicted motion information to the user. Specifically, a model 21 for predicting motion information may be built by training data (e.g., screen images, object attribute information, motion information, etc.) of pre-produced GUI screen samples. Such training may also be performed by the producing device 10, or may also be performed by the prototype providing server 11 or a separate device/system. Next, the producing device 10 may predict the motion information 24 (e.g., destination, time, speed/acceleration, etc.) suitable for the target object by inputting (feeding) GUI screen information 23 to the trained (or learned) model 21. For example, it is assumed that the user produces a GUI screen 31 as illustrated in FIG. 3. In this case, the producing device 10 may determine the most suitable motion for the target object 32 among various motions 33 to 35 using the trained model 21 and may recommend (suggest) the determined motion to the user. By doing so, a production difficulty of the GUI prototype may be greatly reduced and a production convenience thereof may be greatly improved. Various exemplary embodiments of a method for determining a recommended motion will be described in detail later with reference to FIG. 4 and subsequent drawings. In the following description, the machine learning model may also be abbreviated as a 'model' for convenience.

For reference, a shaded object (e.g., 31) in FIG. 3 and subsequent drawings refers to a target object or a motion object, '1\4' refers to a motion, and a thickness of an arrow refers to a size (fastness) of a speed.

In addition, although FIG. 2 illustrates that the trained model 21 is located in the producing device 10, the trained model 21 may also be located in the prototype providing server 11 in some cases. In this case, the producing device 10 may predict the motion information 24 of the target object through the prototype providing server 11 (i.e., through request-response).

The aforementioned devices 10 to 12 may be implemented as at least one computing device. For example, all functions of the producing device 10 may also be implemented in one computing device, a first function of the producing device 10 may also be implemented in a first computing device, and a second function thereof may also be implemented in a second computing device. Alternatively, a specific function of the producing device 10 may also be implemented in a plurality of computing devices.

Figure 32:
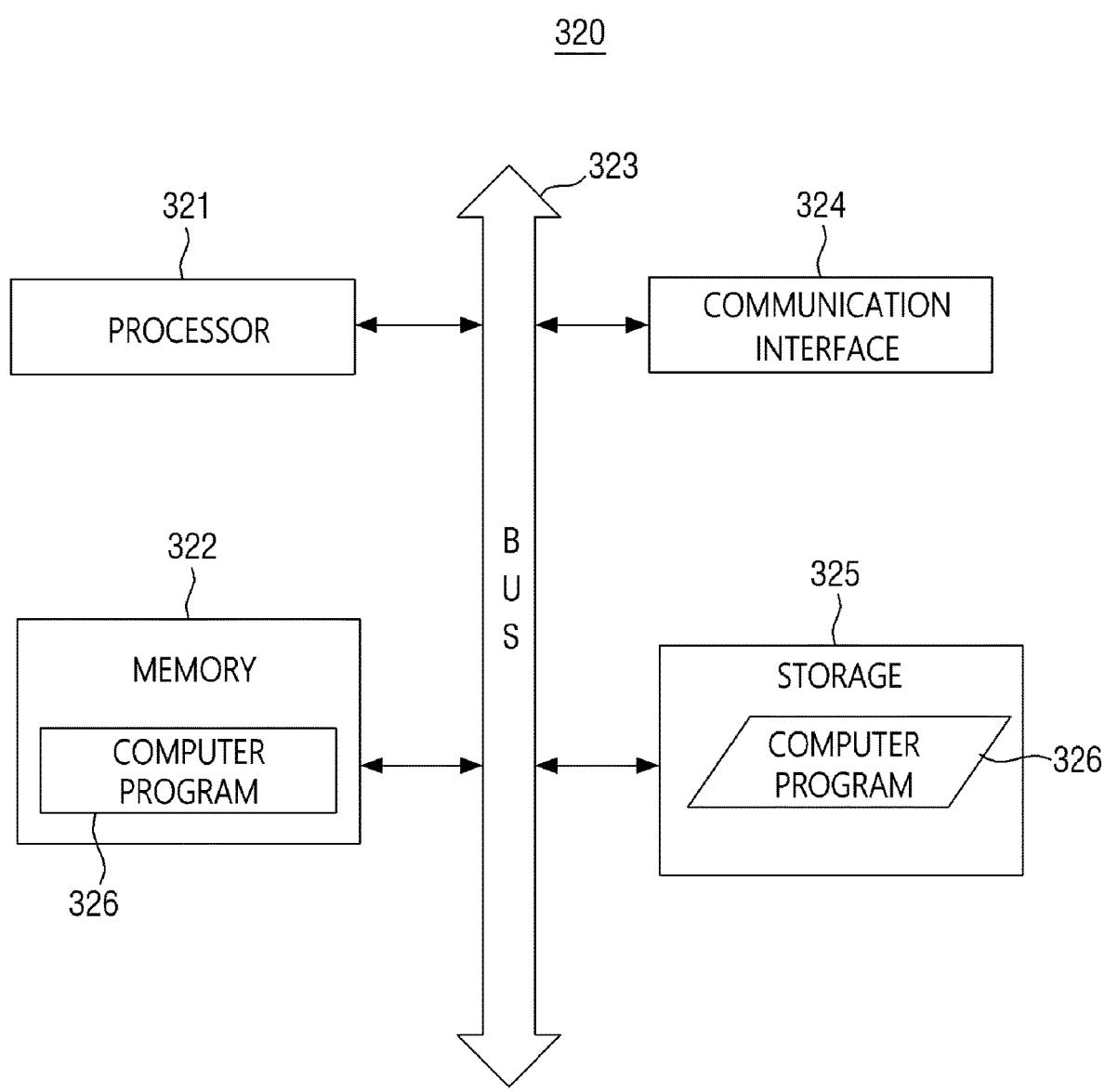
FIG. 32 illustrates an exemplary computing device capable of implementing the prototype producing device or the like according to some exemplary embodiments of the present disclosure.

The computing device may include any device having a computing (processing) function, and reference is made to FIG. 32 for an example of such a device. Since the computing device is an aggregate in which various components (e.g., memory, processor, etc.) interact, it may also be named a 'computing system' in some cases. In addition, the term computing system may also include the meaning of an aggregate in which a plurality of computing devices interact.

As illustrated in FIG. 1, the devices 10 to 12 described above may communicate via a network. Here, the network may be implemented in all types of wired/wireless networks such as a Local Area Network (LAN), a Wide Area Network (WAN), a mobile radio communication network, and Wireless Broadband Internet (Wibro).

So far, the operating environment of the producing device 10 according to some exemplary embodiments of the present disclosure has been described with reference to FIGS. 1 to 3. Hereinafter, various methods that may be performed in the above-described producing device 10 will be described with reference to FIG. 4 and subsequent drawings.

Hereinafter, for convenience of understanding, description will be continued on the assumption that all steps/operations of the methods to be described later are performed in the above-described producing device 10. Therefore, when a subject of a specific step/operation is omitted, it may be understood that the specific step/operation is performed in the producing device 10. In addition, hereinafter, for clarity of the present disclosure, description will be continued while changing reference numerals according to exemplary embodiments.

First, a method for producing a prototype of a GUI according to some exemplary embodiments of the present disclosure will be described with reference to FIGS. 4 to 16.

Figure 4:
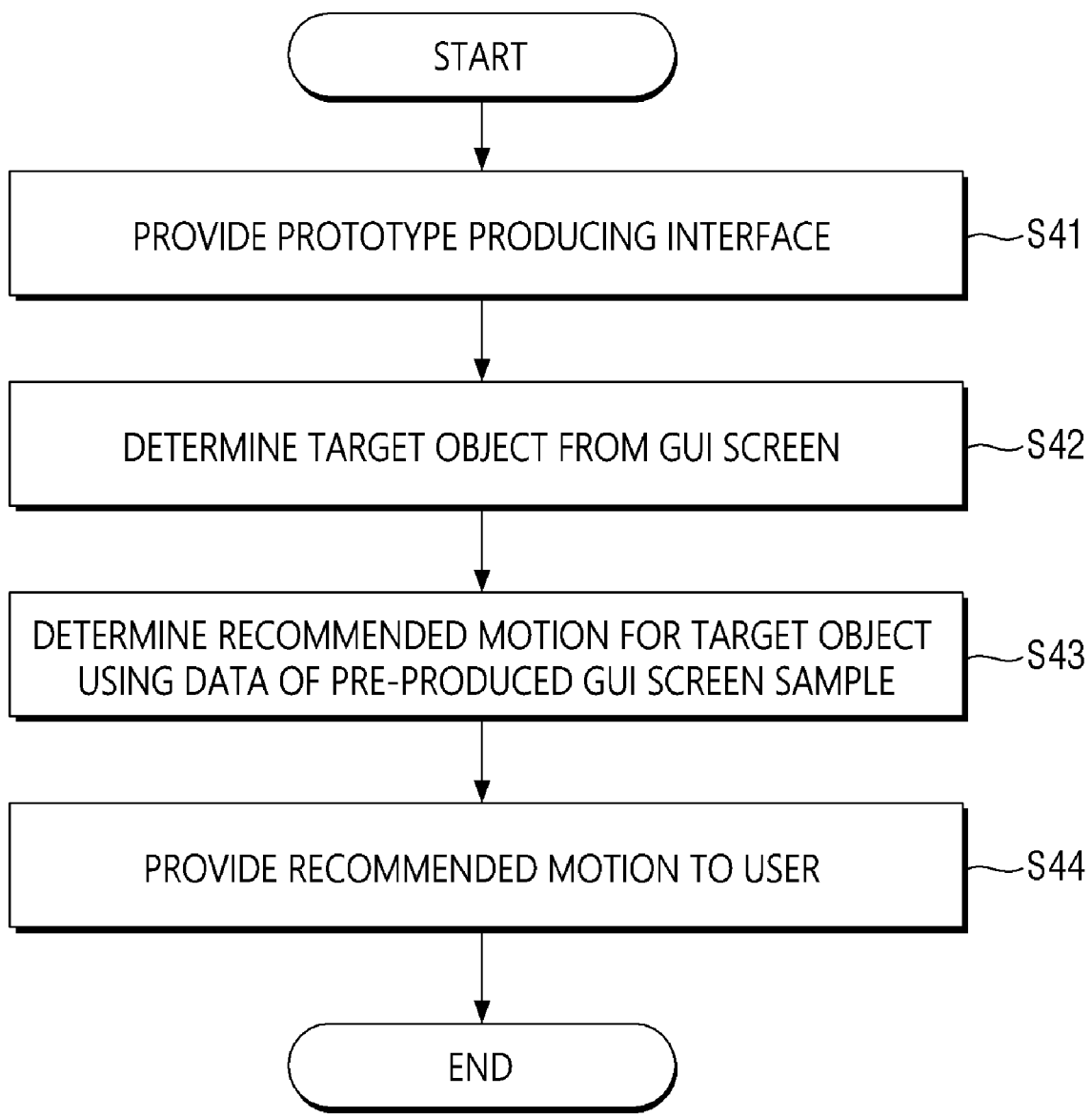
FIG. 4 is an exemplary flowchart schematically illustrating a method for providing a prototype of a graphical user interface (hereinafter referred to as 'GUI') according to some exemplary embodiments of the present disclosure.

FIG. 4 is an exemplary flowchart schematically illustrating a method for producing (or building) a prototype of a GUI according to some exemplary embodiments of the present disclosure. However, this is only a preferred exemplary embodiment for achieving the object of the present disclosure, and some steps may also be added or deleted as needed. The method may be referred to as 'prototyping method'.

As illustrated in FIG. 4, the present exemplary embodiments may start at step 41 of providing a prototype producing interface. For example, the producing device 10 may provide a GUI-based prototype producing interface to the user by executing a prototype producing tool (program) in response to a user's request.

The prototype producing interface may provide the user with various production functions for the prototype of the GUI. For example, the prototype producing interface may provide functions for defining, creating, modifying, and deleting objects (e.g., GUI objects such as buttons and checkboxes), triggers, responses, and interactions. However, the scope of the present disclosure is not limited thereto. The user may freely produce GUI prototypes he or she wants through the prototype producing interface. In order to avoid obscuring the subject matter of the present disclosure, further detailed description of the prototype producing interface will be omitted.

In step S42, a target object may be determined from among one or more objects disposed on a GUI screen being produced (hereinafter, referred to as a 'target GUI screen'). For example, the producing device 10 may determine one or more objects as the target object based on a user's input (e.g., object selection, etc.). The target object may refer to an object to which a motion (or response) is applied (set).

In some exemplary embodiments, the target object may be automatically determined or recommended using a trained model (e.g., in the case of recommendation, the target object may be finally determined by the user's selection). For example, if a confidence score of a specific object output by the model (e.g., see FIG. 6) (that is, a probability that the specific object on the target GUI screen corresponds to a motion object) is greater than or equal to a reference value, the producing device 10 may recommend (propose) to the user that a motion is applied to the specific object (i.e., recommend the corresponding object as the target object). In order to provide more convenience of understanding, the present exemplary embodiments will be further described with reference to FIGS. 5 to 7.

Figure 5:
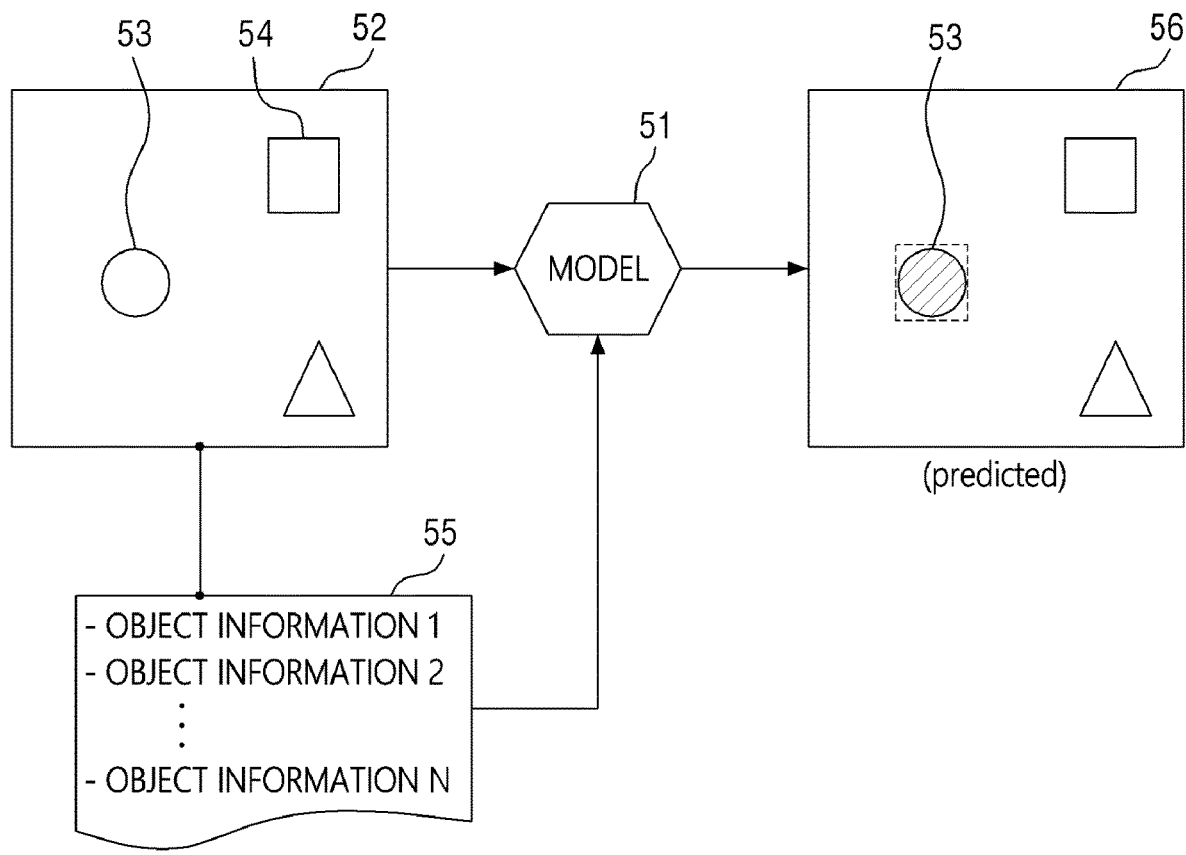
FIGS. 5 to 7 are exemplary diagrams for explaining a method for determining a target object according to some exemplary embodiments of the present disclosure.

FIG. 5 is an exemplary diagram for explaining a method for determining a target object according to some exemplary embodiments of the present disclosure.

As illustrated in FIG. 5, the producing device 10 may determine one or more objects 53 as a target object through a trained model 50 (e.g., a machine learning model or a deep learning model). Specifically, the model 51 may be configured to predict a motion object (or motion area) by receiving GUI screen information and may be trained using data of pre-produced GUI screen samples.

The GUI screen information may include various types of information on the GUI screen without limitation. For example, the GUI screen information may include information on a GUI screen image, GUI screen attributes (e.g., identifier (ID), name, layout, background color, number of objects, task, design pattern, user's design intention, etc.), object attributes, and the like. However, the present disclosure is not limited thereto.

The object attribute information may include, for example, information on an identifier, a name, display attributes (e.g., type, position, color, size, shape, transparency, azimuth, etc.), a motion (e.g., whether it is a motion object, destination, time, motion pattern, speed/acceleration, path, motion effect, etc.), and the like, but is not limited thereto. The object attribute information may also be named 'object information' for convenience.

The producing device 10 may input (feed) the image of the target GUI screen 52, the attribute information 55 of the objects (e.g., 53, 54, etc.) into the trained model 51, and may predict (determine) a motion object 53 suitable for the target GUI screen 52. Then, the producing device 10 may determine the predicted object 53 as a target object or recommend the predicted object 53 to the user.

Alternatively, the producing device 10 may predict (determine) a motion area (e.g., an area determined to be good if the motion is set) of the target GUI screen 52 through the trained model 51, and may determine an object located close to the motion area as a target object or may recommend the object to the user.

For reference, FIG. 5 illustrates a predicted result of the model 51 in the form of a bounding box (see 56) for convenience of understanding, but it does not mean an actual output form of the model 51, and the output of the model 51 may be configured in various forms. For example, the model 51 may be configured to output an identifier of the motion object, a position (e.g., coordinates), and a probability that each object corresponds to the motion object (i.e., a confidence score).

Figure 6:
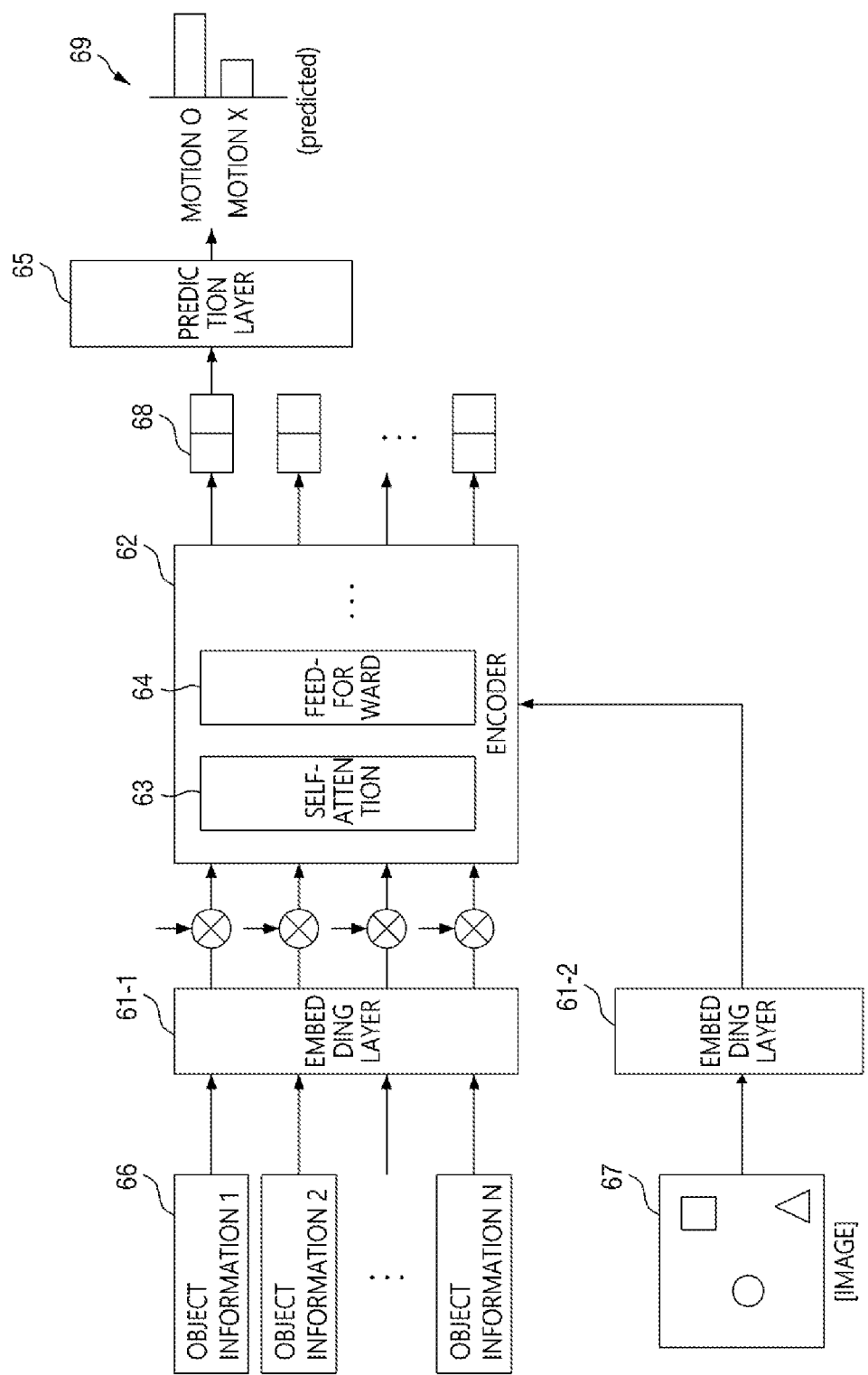

An exemplary detailed structure of the model 51 is illustrated in FIG. 6.

As illustrated in FIG. 6, the model 51 may include embedding layers 61-1 and 61-2, an encoder 62, and a prediction layer 65. In some cases, the model 51 may further include other layers or may be configured in a form in which some layers are omitted.

The embedding layer 61-1 (hereinafter referred to as a 'first embedding layer') may receive information (e.g., 66) on each object and generate an embedding of the corresponding object (i.e., an embedding in object units). The first embedding layer 61-1 may be implemented as a neural network layer such as a fully-connected layer or a multi-layer perceptron (MLP), for example, but the scope of the present disclosure is not limited thereto.

In some cases, some attribute information of the object may be reflected (e.g., addition, multiplication, concatenation, etc.) in the object embedding output from the first embedding layer 61-1. For example, position information (or type information, etc.) of the object may be encoded in an appropriate form and reflected in the output embedding of the first embedding layer 61-1. In this case, the encoder 62 generates a final embedding (e.g., 68) in the object units by performing encoding in further consideration of the position information (or type information, etc.) of the object.

Next, the embedding layer 61-2 (hereinafter referred to as a 'second embedding layer') may receive a GUI screen image 67 and generate an embedding of the corresponding image. The second embedding layer 61-2 may be implemented as a neural network layer such as a fully-connected layer, an MLP, or a convolutional layer, for example, but the scope of the present disclosure is not limited thereto. The embedding of the GUI screen image 67 may serve to deliver overall design information (or context) of the GUI screen image 67 to the encoder 62.

In some cases, the embedding layer (e.g., 61-1) may be named as an 'embedder' or an 'embedding module'.

Next, the encoder 62 may encode the input embeddings (information) to generate (output) the embeddings (e.g., 68) in object units. As illustrated, the encoder 62 may include at least one self-attention layer 63 and at least one feed-forward layer 64. The self-attention layer 63 may analyze a correlation between the input object embeddings, a correlation between the object embeddings and the embedding of the GUI screen image 67, and the like, and the feed-forward layer 64 may aggregate an analysis result. Structures and operating principles of the self-attention layer 63 and the feed-forward layer 64 are already known to those skilled in the art, and thus descriptions thereof will be omitted.

In some cases, the self-attention layer 63 and the feed-forward layer 64 may be named as a 'self-attention module' or a 'feed-forward module', respectively.

Next, the prediction layer 65 may receive the embedding (e.g., 68) in object units and predict whether the corresponding object is a motion object. In other words, the prediction layer 65 may receive the embedding (e.g., 68) in object units and output a confidence score 69 for the motion object. The prediction layer 65 may be implemented as a neural network layer (e.g., fully-connected layer, MLP, etc.) that performs binary classification, but the scope of the present disclosure is not limited thereto.

In some cases, the prediction layer 65 may also be named as a 'predictor', a 'predicting module', and the like.

The above-described model 51 may be trained through a motion object prediction task (i.e., a task performed by the prediction layer 65). That is, weight parameters of the model 51 may be updated by backpropagating a loss (e.g., a cross-entropy loss between prediction result and correct answer) calculated by performing the motion object prediction task using the data of pre-produced GUI samples (e.g., predicting whether the specific object corresponds to the motion object).

In some cases, the above-described model 51 may also be trained by further performing a motion information prediction task (e.g., a task of predicting a value of a motion element through another prediction layer). The motion information prediction task will be described later.

Figure 7:
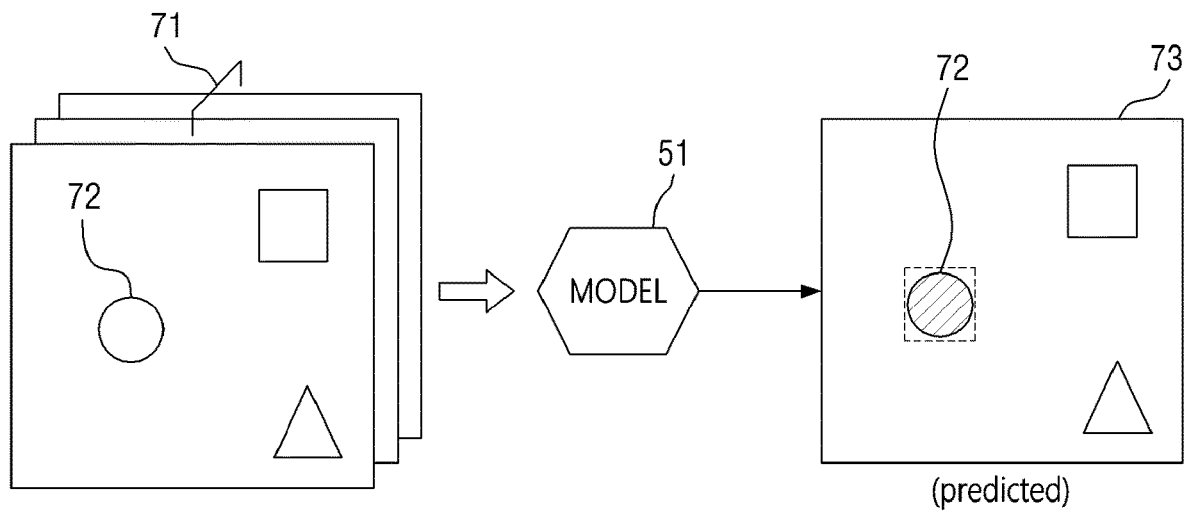

Meanwhile, in some exemplary embodiments, as illustrated in FIG. 7, the model 51 may also be configured to predict motion objects (see 72 and 73) by receiving information of a plurality of GUI screens 71 (e.g., GUI screens before and after applying the response, pages connected through hyperlinks, etc.) associated with each other. In this case, in order to more accurately analyze a relationship between the GUI screens, the model 51 may also include a plurality of encoders (e.g., 62) connected to each other (e.g., a structure such as a recurrent neural network (RNN)). According to the exemplary embodiments, since the model 51 may more accurately grasp the context of the GUI screen, the motion object may be more accurately predicted.

In addition, in some exemplary embodiments, the model 51 may also be implemented based on a convolutional neural network (CNN). Specifically, the model 51 may be configured to receive the GUI screen image to predict the motion object (or the motion area), and may be trained using the data (e.g., the GUI screen images and motion object/area information) of pre-produced GUI screen samples.

The description will be provided with reference to FIG. 4 again.

In step S43, a recommended motion for a target object may be determined using the data of the pre-produced GUI screen samples (i.e., GUI screens including the motion object). For example, the producing device 10 may determine the recommended motion by predicting values of all motion elements constituting the recommended motion or by predicting a value of a specific motion element whose value is not input from the user (e.g., when values of some motion elements are input from the user). Such a process may be performed in response to a user's request (e.g., button click, etc.) or may be automatically performed when a preset condition is satisfied (e.g., automatically performed when a cursor hovers over a specific area of the GUI screen or a target object for a certain period of time, etc.). In some cases, as the preset condition (e.g., when the confidence score of the target object output by the model 51 illustrated in 5 is greater than or equal to the reference value) is satisfied, the producing device 10 may also suggest the user to receive the recommended motion. The number of recommended motions may be one or several.

The motion element may refer to an element constituting a motion (or motion information) of an object or an element for defining a motion of an object. Examples of the motion element include a destination (e.g., destination coordinates), a time (i.e., a travel time to the destination), speed/acceleration, a motion pattern (e.g., a straight line movement pattern, a curved movement pattern, a zigzag movement pattern, etc.), and the like, but the scope of the present disclosure is not limited thereto.

In some cases, the concept of motion may also encompass a change in the display attributes (e.g., size, color, etc.) of the object without a change in position, and in this case, the display attributes of the object may also be included in the motion element.

Meanwhile, a specific method for determining the recommended motion of the target object may vary according to exemplary embodiments.

Figure 8:
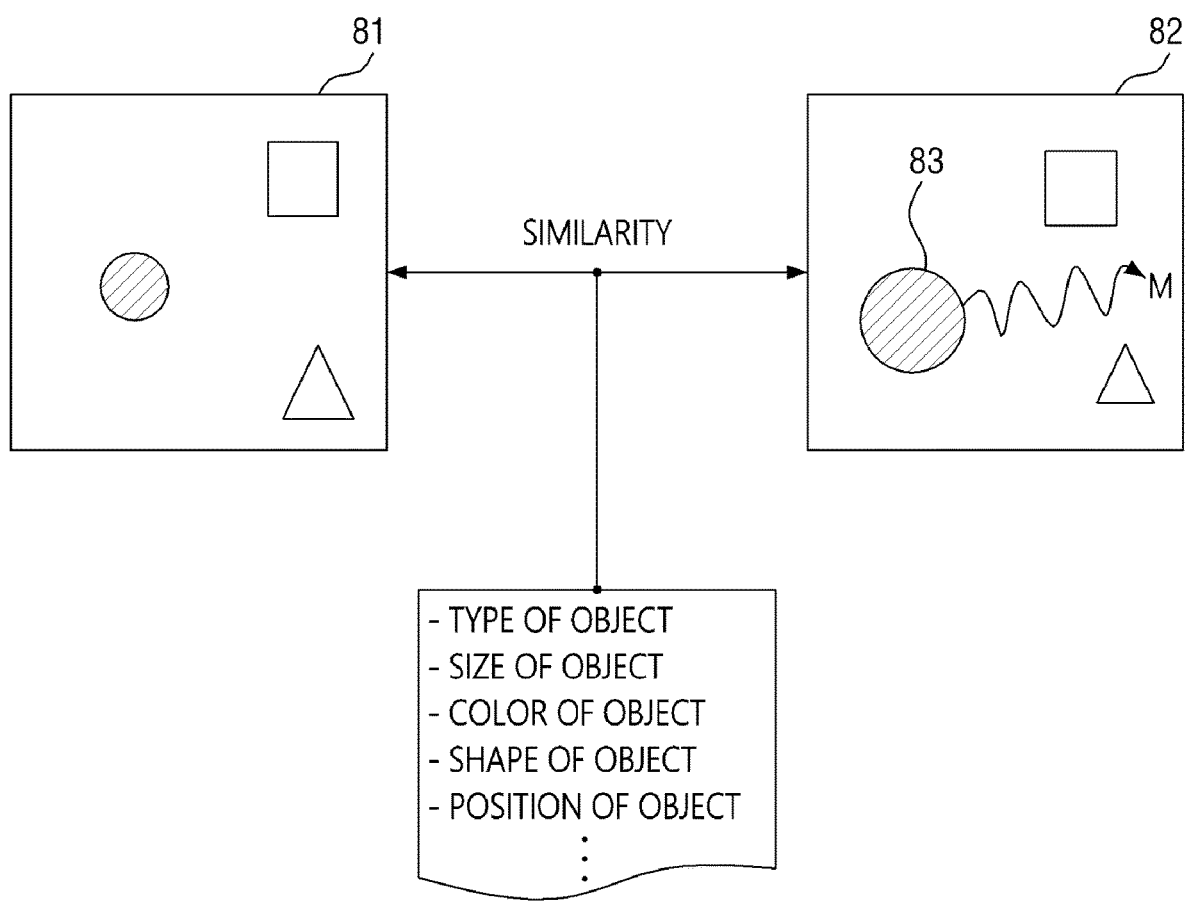
FIG. 8 is an exemplary diagram for explaining a method for calculating a similarity of GUI screens according to some exemplary embodiments of the present disclosure.

In some exemplary embodiments, as illustrated in FIG. 8, a similarity between a pre-produced GUI screen sample 82 and a target GUI screen 81 may be calculated based on a design similarity (or visual/image similarity). In this case, the GUI screen sample 82 may include a motion object 83. For example, the producing device 10 calculates the design similarity based on the display attributes of the object (e.g., type, size, color, shape, position) and the display attributes of the GUI screen (e.g., a design pattern, the number of objects, etc.). In addition, the producing device 10 may select the GUI screen sample (e.g., 82) having a similarity equal to or greater than a reference value as a reference sample, and may determine a recommended motion for a target object by using the motion object (e.g., 83) of the reference sample (e.g., 82) (e.g., referring to the motion information). For example, the producing device 10 may determine information of the recommended motion by referring to motion information (i.e., values of the motion elements) of the corresponding motion object (e.g., 83).

Figure 9:
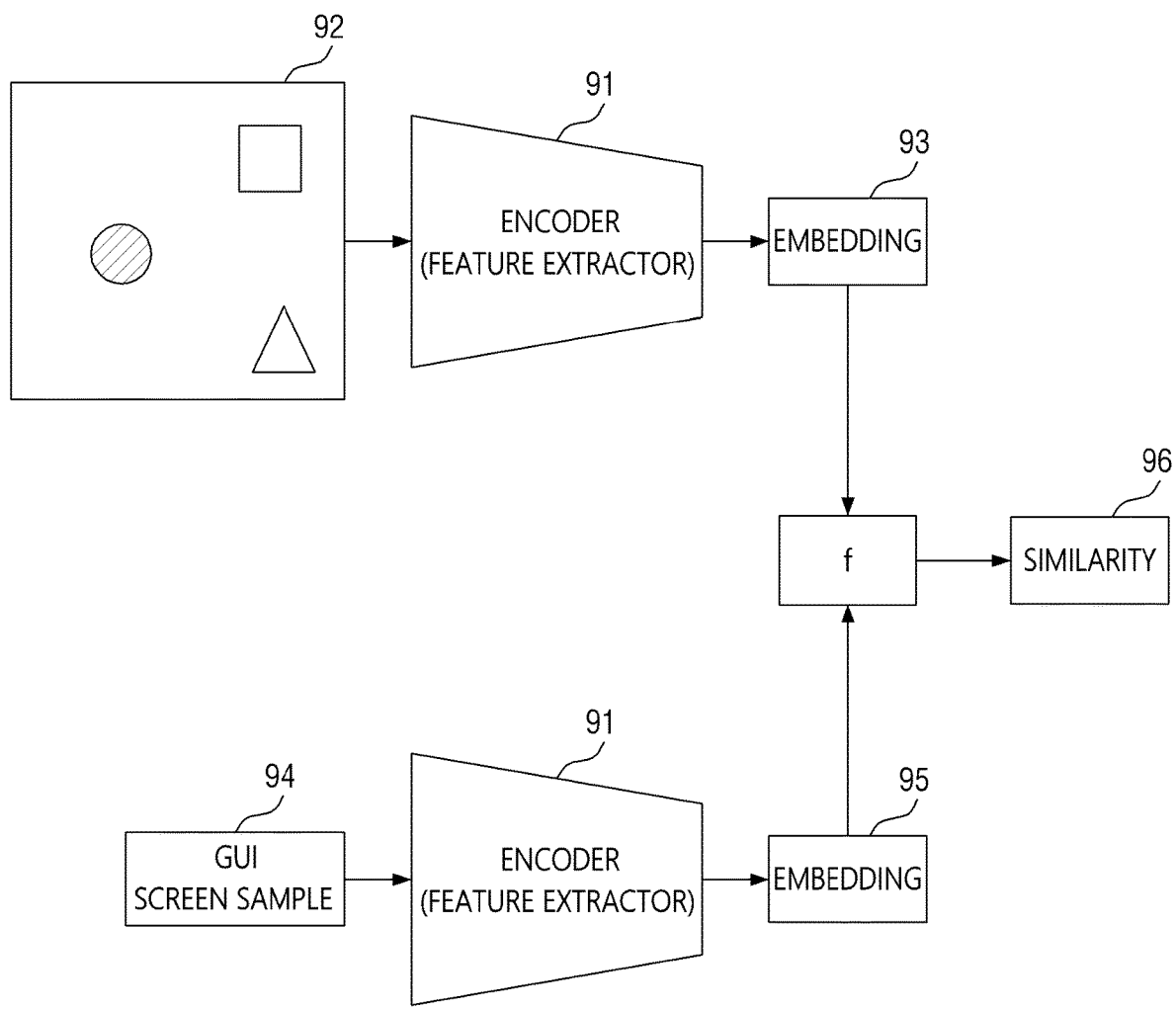
FIG. 9 is an exemplary diagram for explaining a method for calculating a similarity of GUI screens according to some other exemplary embodiments of the present disclosure.

In some other exemplary embodiments, as illustrated in FIG. 9, a similarity between a pre-produced GUI screen sample 94 and a target GUI screen 92 may be calculated based on an embedding similarity 96 (or feature similarity). For example, the producing device 10 may generate embeddings 93 and 95 for each of the target GUI screen 92 and the pre-produced GUI screen sample 94 through an encoder 91 (or feature extractor). In this case, the encoder 91 may be a pretrained model (e.g., a feature extractor such as VGG16) or a model trained through a contrastive learning task or the like. The encoder 91 may also be configured to receive only the GUI screen image or may also be configured to further receive other information (e.g., object attribute information, etc.). Similarly to the previous exemplary embodiments, the producing device 10 may select a GUI screen sample having an embedding similarity 96 equal to or greater than the reference value as a reference sample, and determine a recommended motion for a target object using the motion object of the reference sample.

Figure 10:
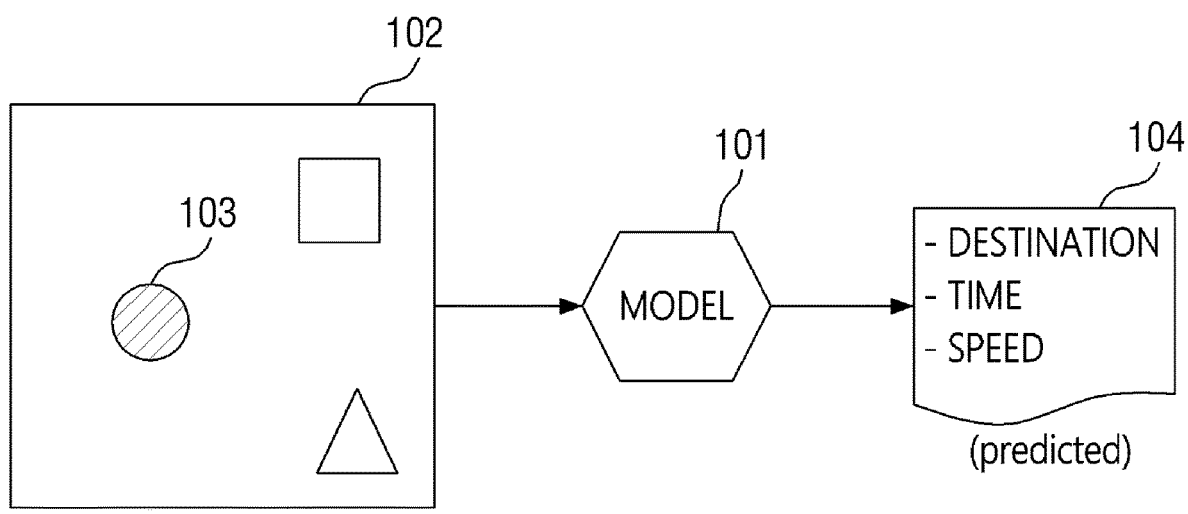
FIGS. 10 to 12 are exemplary diagrams for explaining a method for predicting a recommended motion of a target object using a machine learning model according to some exemplary embodiments of the present disclosure.
Figure 11:
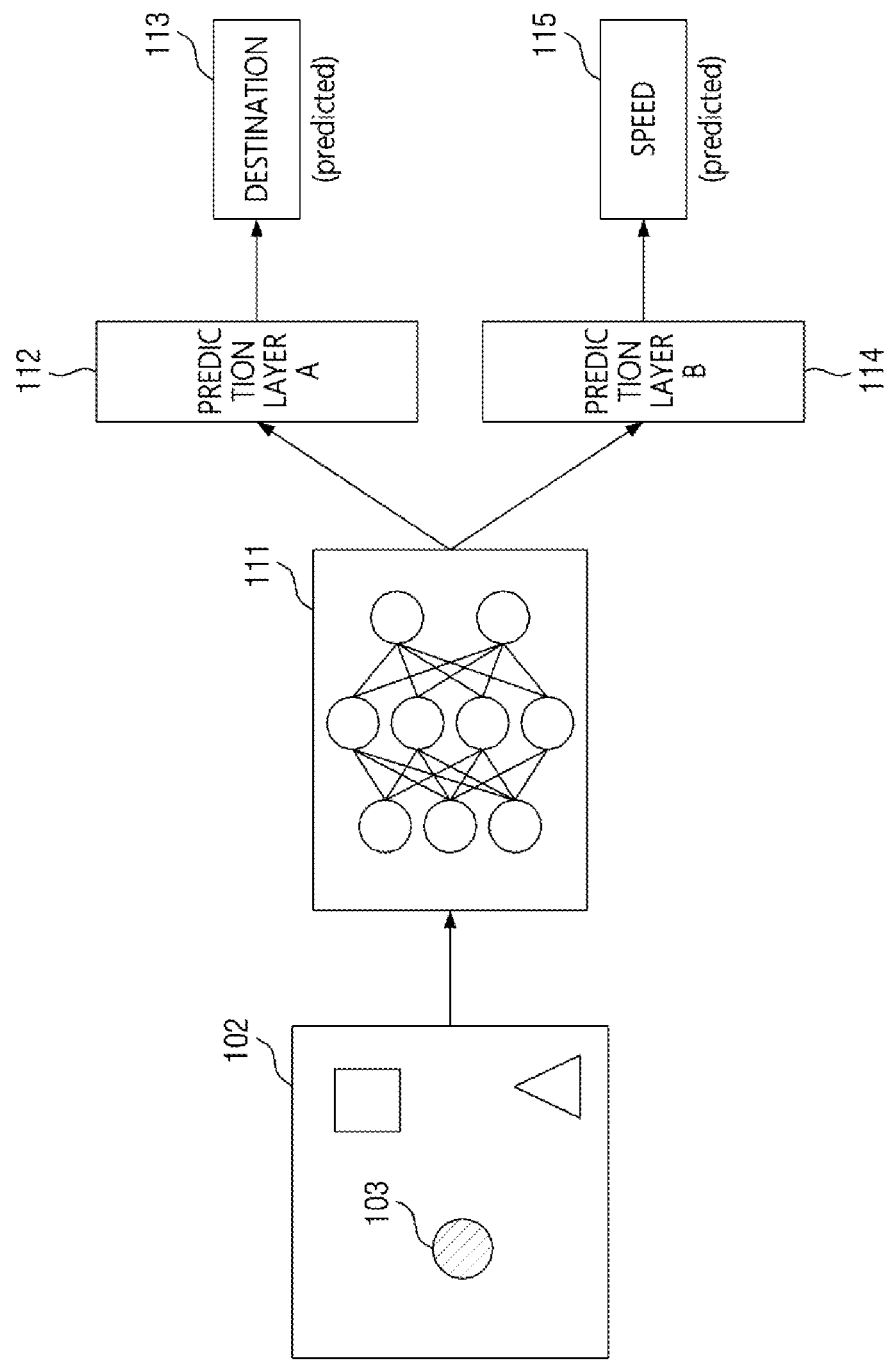

In some still other exemplary embodiments, as illustrated in FIG. 10, recommended motion information 104 for a target object 103 may be predicted using a trained model 101. Specifically, the model 101 may be trained to predict motion information (e.g., destination, time, speed, etc.) of the motion object using the pre-produced GUI screen samples (i.e., samples given motion information). For example, as illustrated in FIG. 11, the model 101 may include a module 111 (e.g., an embedding layer, an encoder, etc.) that analyzes GUI screen information and a plurality of prediction layers (e.g., 112 and 114) that predict values of different motion elements. The model 101 of such a structure may be trained by performing a task of predicting the values of the different motion elements using data of the pre-produced GUI screen samples (e.g., trained by performing a destination prediction task through a first prediction layer 112 and a speed prediction task through a second prediction layer 114). In addition, the producing device may input (feed) information of a target screen 102 into the trained model 101 and may predict element values (e.g., 113 and 115) of the recommended motion of the target object 103 through the prediction layers (e.g., 112 and 114).

For reference, in the drawings of FIG. 10 and the like, the inputting of the GUI screen (e.g., 102) into the model (e.g., 101) may mean that the information (e.g., an image of the GUI screen, screen attribute information, object attribute information, etc.) of the GUI screen (e.g., 102) is input to the model (e.g., 101), and the type of input information may be varied.

Figure 12:
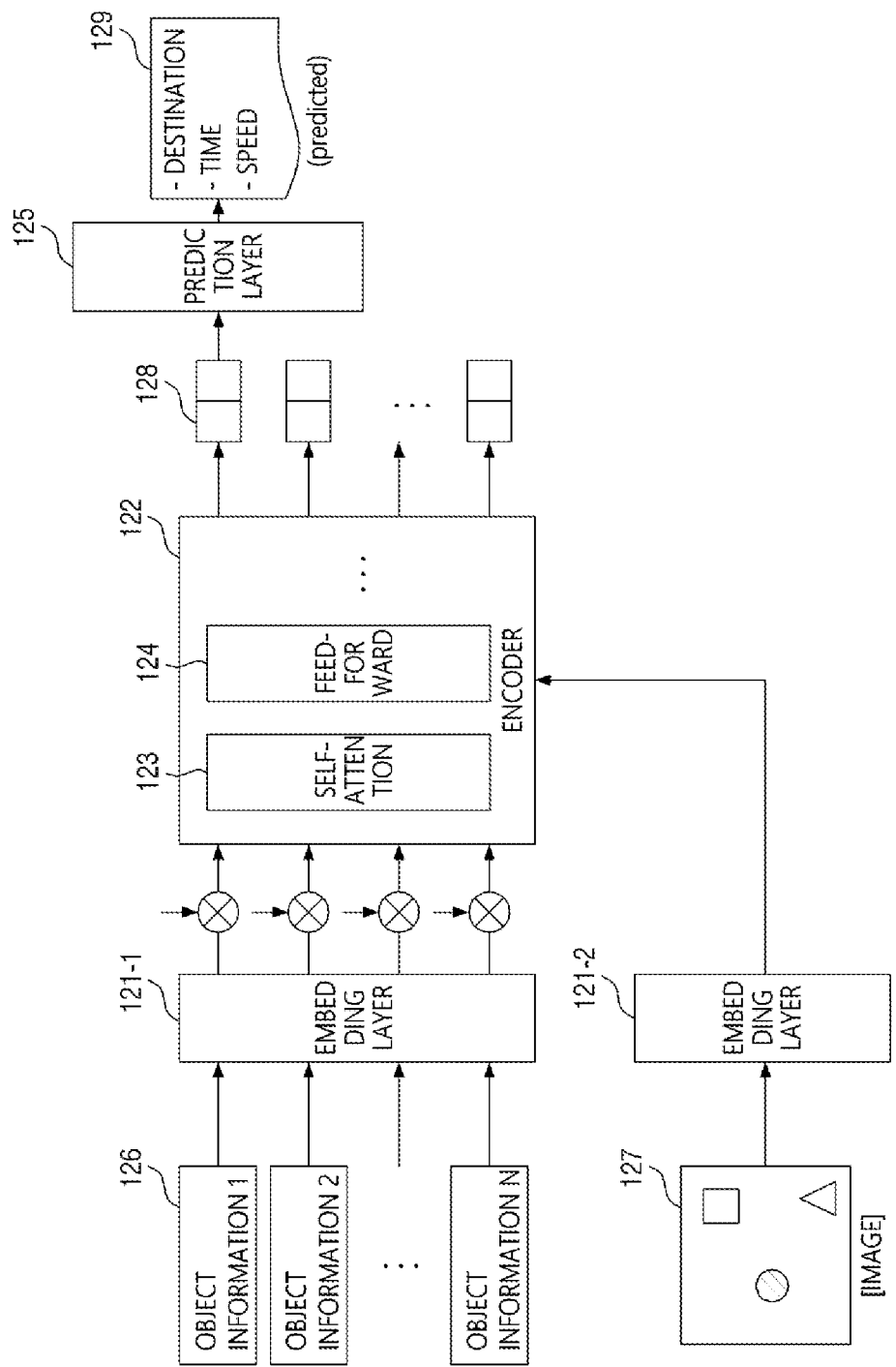

FIG. 12 illustrates an exemplary detailed structure of the model 101.

As illustrated in FIG. 12, the model 101 may include embedding layers 121-1 and 121-2, an encoder 122, and a prediction layer 125. Here, the prediction layer 125 may include a plurality of prediction layers that predict values of different motion elements (see 129). In some cases, the model 101 may further include other layers or may be configured in a form in which some layers are omitted.

The components (e.g., 121-1, etc.) and related information (e.g., 126 to 128, etc.) of the model 101 refer to the description of FIG. 6. For reference, the model 101 may be substantially the same as the model 51 illustrated in FIG. 6 (that is, the model 51 used in the step S42 for determining the target object may be used again in the step S43 for determining the recommended motion).

The above-described model 101 may be trained through a motion information prediction task (i.e., a task performed by the prediction layer 125). That is, weight parameters of the model 101 may be updated by backpropagating a loss (e.g., a regression loss between a predicted value and a correct answer) calculated by performing the motion information prediction task (e.g., the task of predicting the destination, time, speed, etc.) using the data of pre-produced GUI samples.

Figure 13:
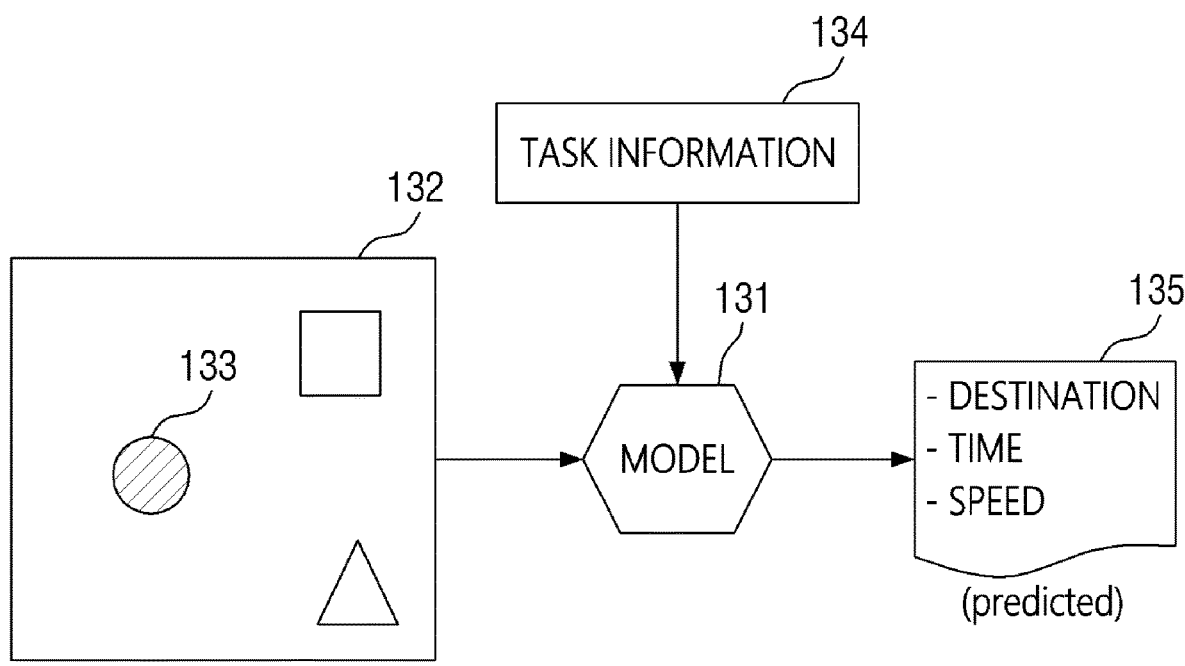
FIG. 13 is an exemplary diagram for explaining a method for predicting a recommended motion of a target object using a machine learning model according to some other exemplary embodiments of the present disclosure.

In some still other exemplary embodiments, as illustrated in FIG. 13, recommended motion information 135 of a target object 133 may be predicted by further inputting task information 134 of a target GUI screen 132 to a trained model 131. The model 131 may be trained to predict motion information of a motion object by further receiving task information of pre-produced GUI screen samples. The model 131 trained in this way may predict the recommended motion information 135 by further considering the task of the target GUI screen 132. The task information 134 refers to a description of FIG. 17 and the like.

Figure 14:
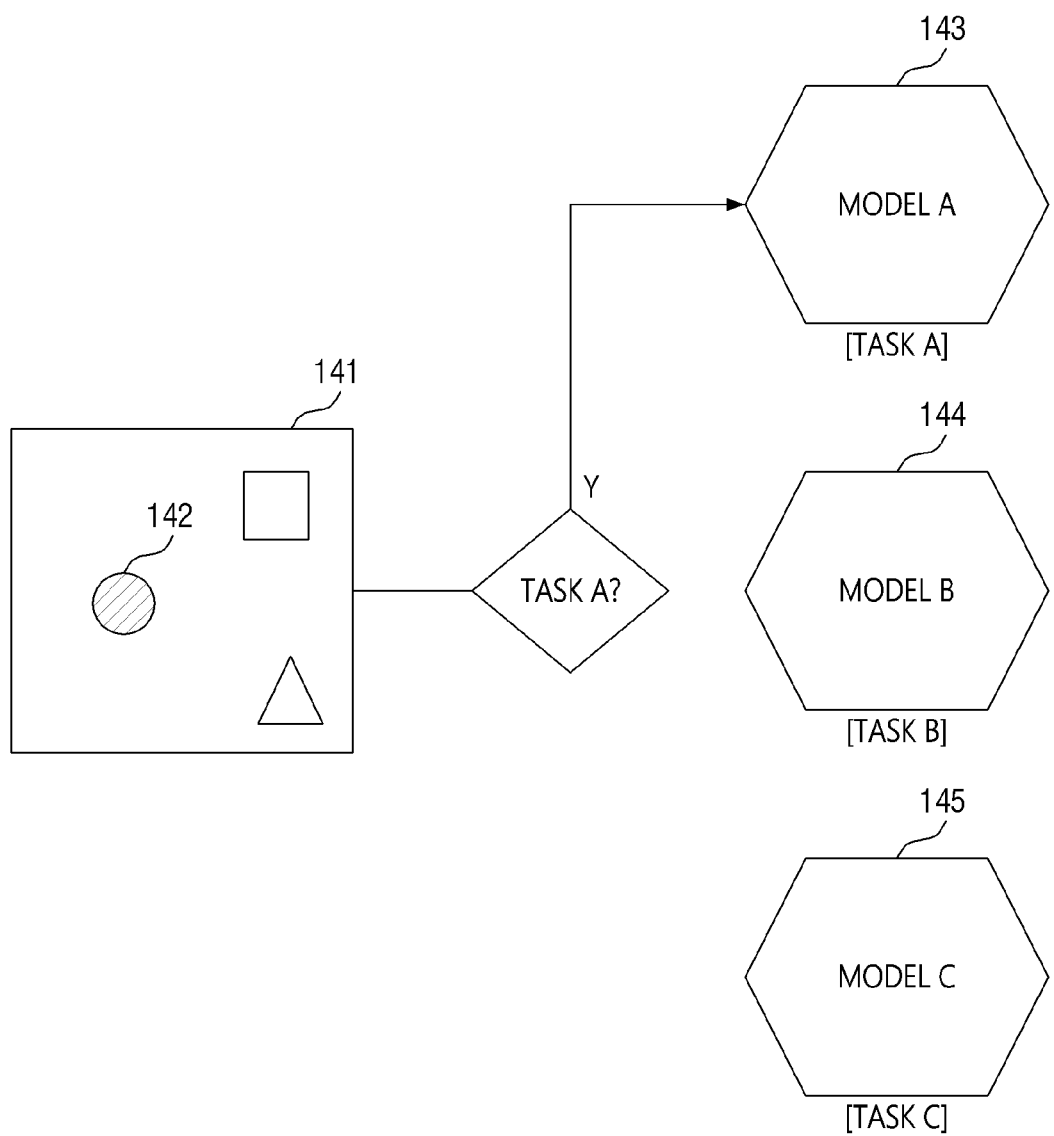
FIG. 14 is an exemplary diagram for explaining a method for predicting a recommended motion of a target object using a machine learning model according to some still other exemplary embodiments of the present disclosure.

In some still other exemplary embodiments, as illustrated in FIG. 14, models (e.g., 143 to 145) predicting motion information for each task may be built. For example, a first model 143 may be built by training GUI screen samples related to a first task (see 'A'), and a second model 144 may be built by training GUI screen samples related to a second task (see 13'). In this case, the producing device 10 may select a model (e.g., 143) corresponding to a task of a target GUI screen 141 from among a plurality of models (e.g., 143 to 145) and may predict recommended motion information of a target object 142 using the selected model (e.g., 143).

In some still other exemplary embodiments, the recommended motion for the target object may also be determined based on various combinations of the above-described exemplary embodiments. For example, the producing device 10 may determine a first value for a motion element using a motion object of a reference sample and may predict a second value of the same motion element through the trained model (e.g., 101). In addition, the producing device 10 may also determine element values of the recommended motion in a manner of deriving a final value of a corresponding motion element through a weighted sum of the first value and the second value. In this case, the weights given to the two values may be determined based on a performance of the model 101 (e.g., a size of evaluation error (loss), etc.) and the degree of training (e.g., number of epochs) (e.g., the higher the performance, the higher the weight given to the second value and the smaller the weight given to the first value), but the scope of the present disclosure is not limited thereto.

The description will be provided with reference to FIG. 4 again.

In step S44, the recommended motion of the target object may be provided to the user. For example, the producing device 10 may also display an image of the recommended motion or element values of the recommended motion in a specific area of the prototype producing interface.

Figure 15:
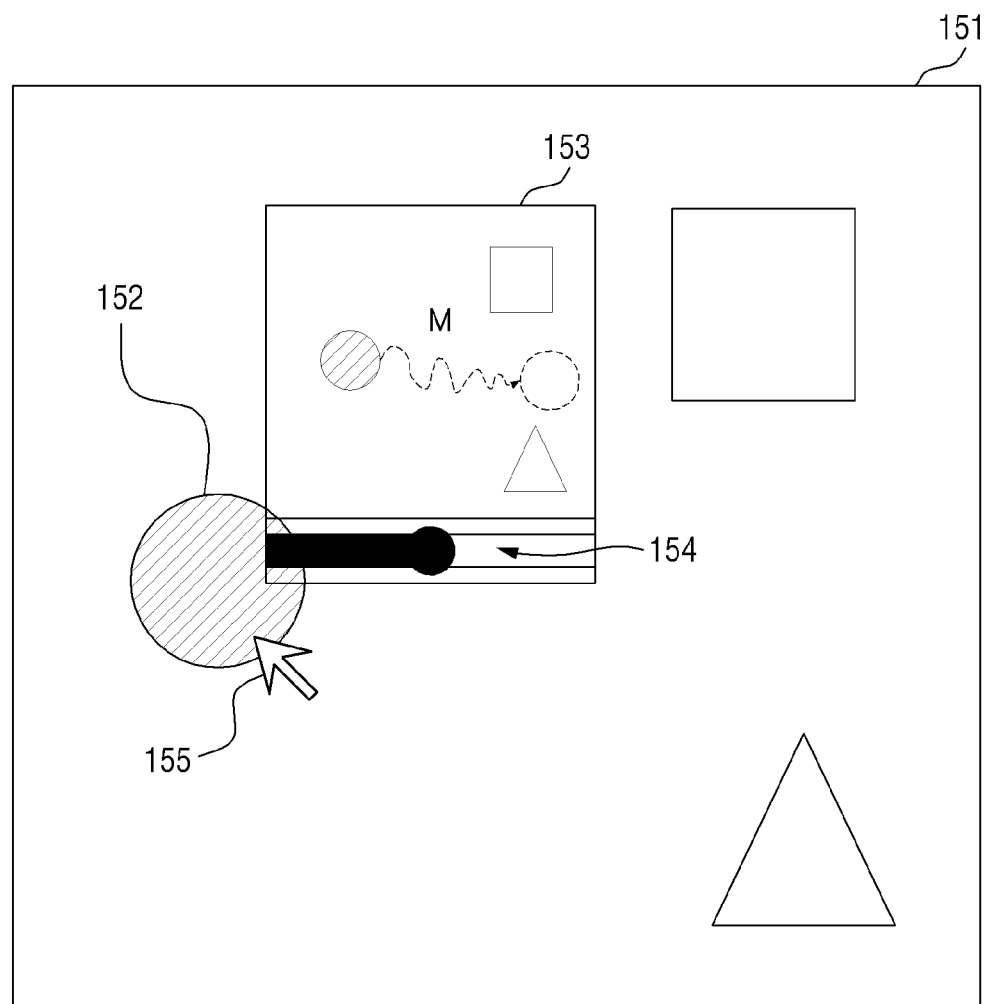
FIG. 15 is an exemplary diagram for explaining a method for providing a recommended motion according to some exemplary embodiments of the present disclosure.

In some exemplary embodiments, as illustrated in FIG. 15, the image (e.g., video) of the recommended motion of the target object may be displayed through a preview window 153 (see a play bar 154). For example, the producing device 10 may display a target GUI screen 151 in a main area of the prototype producing interface and may display the image of the recommended motion of the target object 152 by generating the preview window 153 at a position adjacent to the target object 152 (or another position). FIG. 15 illustrates, as an example, a case in which the image of the recommended motion is displayed in response to a hovering event (e.g., an event generated when a cursor 155 hovers over the object for a certain period of time) on the target object 152, but the scope of the present disclosure is not limited thereto. In some cases, the producing device 10 may also display element values 156 of the recommended motion. In addition, when a user's input to change the element values 156 is received, the producing device 10 may update the image of the recommended motion by reflecting a changed value to the image of the recommended motion and display the updated image through the preview window 153.

Figure 16:
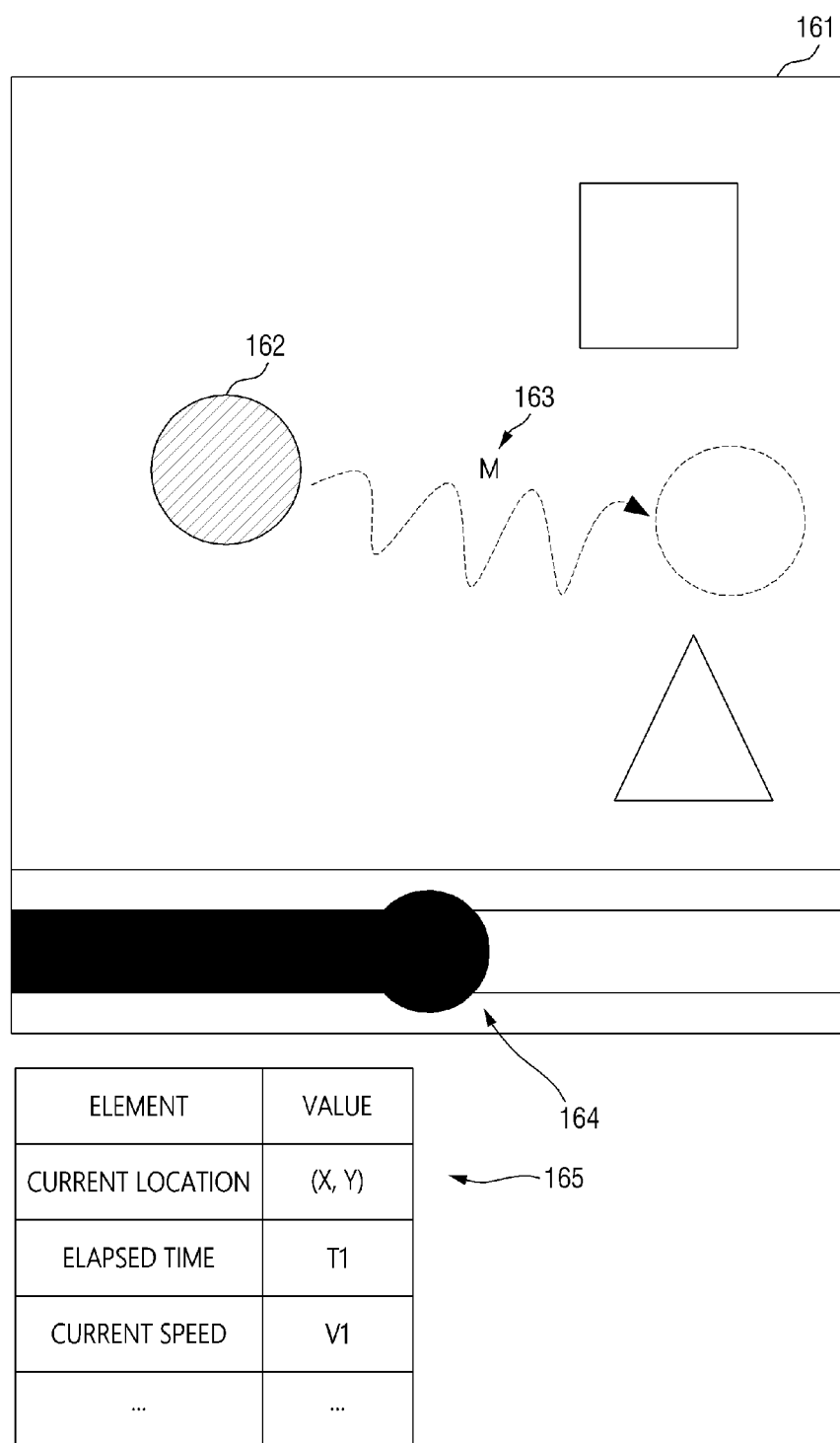
FIG. 16 is an exemplary diagram for explaining a method for providing a recommended motion according to some other exemplary embodiments of the present disclosure.

In some other exemplary embodiments, as illustrated in FIG. 16, a recommended motion 163 of a target object 162 may also be displayed (played) on a target GUI screen 161. In this case, the producing device 10 may also provide an adjustment function for a playback position or the like through a playback bar 164, and may also provide motion information 165 (e.g., a current position of the object, an elapsed time, a current speed, etc.) at a current playback time. In some cases, the producing device 10 may further provide the user with a function (i.e., a kind of motion simulation function) of updating and displaying the recommended motion 163 according to a change in the motion information 165 (e.g., a value of a specific element is changed by the user).

In some still other exemplary embodiments, the producing device 10 may further provide the user with other recommended motions based on a user's negative feedback (e.g., clicking a preview window close button, clicking a dissatisfaction button, clicking a cancel button, etc.). For example, the producing device 10 may re-determine and provide the recommended motion in response to the user's negative feedback, or change the target object to another object and provide the recommended motion again.

In some still other exemplary embodiments, the producing device 10 may reflect the recommended motion on the target GUI screen in response to a user input (e.g., clicking a satisfaction button, clicking a recommended motion reflecting button, etc.) that accepts the recommended motion (that is, set (apply) the recommended motion to the target object). By doing so, a production speed of the prototype of the GUI may be greatly improved.

In some still other exemplary embodiments, the recommended motion may also be provided based on various combinations of the above-described exemplary embodiments.

So far, the method for producing the prototype of the GUI according to some exemplary embodiments of the present disclosure has been described with reference to FIGS. 4 to 15. As described above, the recommended motion for the target object may be determined by referring to the motion objects of the pre-produced GUI screen samples, and the determined recommended motion may be provided to the user. In this case, the production convenience of the prototype of the GUI may be improved and the production difficulty thereof may be greatly reduced. In addition, the cost required for producing the prototype of the GUI may be reduced and the quality of the produced prototype of the GUI may be improved.

Hereinafter, a method for producing a prototype of a GUI according to some other exemplary embodiments of the present disclosure will be described with reference to FIGS. 17 to 19. Hereinafter, for clarity of the present disclosure, the description of overlapping contents with the previous exemplary embodiments will be omitted, and the technical spirit of the previous exemplary embodiments may be applied to exemplary embodiments to be described later even without separate description. In addition, the technical ideas of the exemplary embodiments to be described later may also be applied to the previous exemplary embodiments even without separate description.

Figure 17:
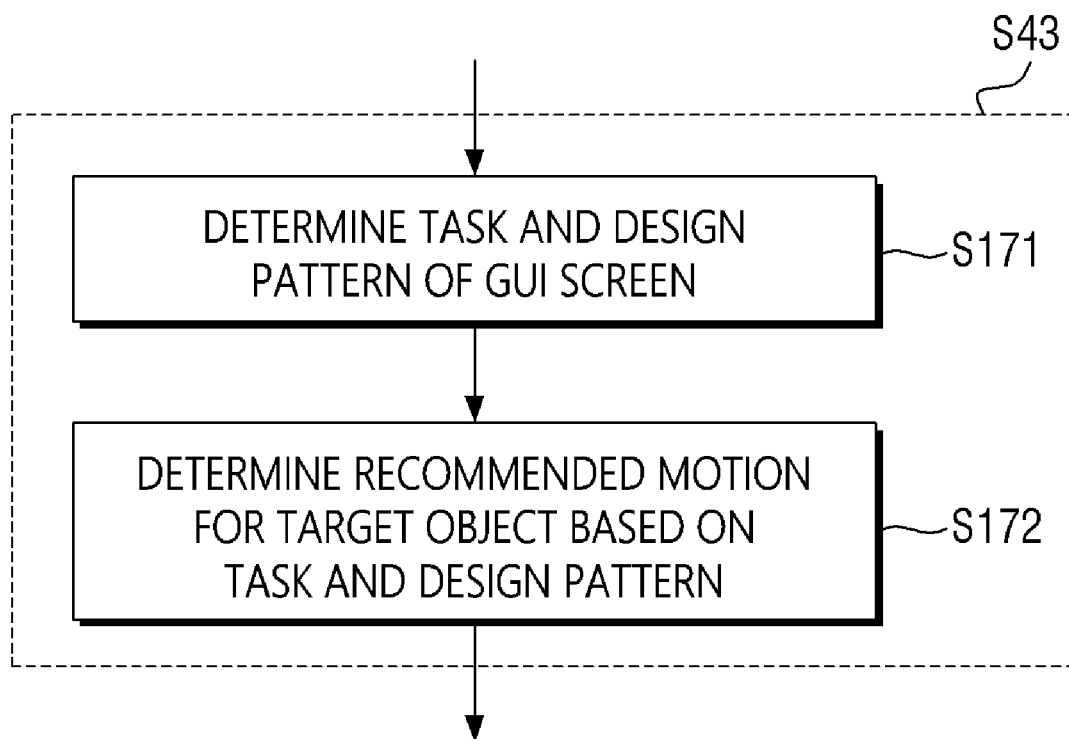
FIG. 17 is an exemplary flowchart for explaining a method for producing a prototype of a GUI according to some other exemplary embodiments of the present disclosure.

FIG. 17 is an exemplary flowchart schematically illustrating a method for producing a prototype of a GUI according to some other exemplary embodiments of the present disclosure.

As illustrated in FIG. 17, the present exemplary embodiments relate to a method for determining a recommended motion for a target object based on (or more based on) a task and/or a design pattern of a target GUI screen. FIG. 17 illustrates, as an example, a case in which a recommended motion of a target object is determined based on both a task and a design pattern, but the recommended motion of the target object may also be determined based on either the task or the design pattern. The target object may be determined in a manner similar to the previous exemplary embodiments.

The task of the GUI screen refers to a purpose, use, or function of the GUI screen (e.g., a function that the GUI screen is responsible for within an application), and for example, a GUI screen related to a shopping app may have tasks such as providing product information, processing a purchase, and providing error information.

In addition, the design pattern of the GUI screen may refer to a pattern such as a carousel, a modal, a flip, and the like. The types of tasks and design patterns may be predefined.

Specifically, in step S171, a task and a design pattern of the target GUI screen may be determined. For example, the producing device 10 may receive information on the task and the design pattern of the target GUI screen from the user (e.g., when the task and the design pattern of the target GUI screen are attribute information of the GUI screen set by the user).

In some exemplary embodiments, as illustrated in FIG. 18, design patterns (e.g., 183 and 185) of target GUI screens (e.g., 182 and 184) may be determined (predicted) using a trained model 181. The task of the target GUI screen may also be determined (predicted) in a similar way. Specifically, the model 181 may be a model (i.e., a classification model) trained to predict the design pattern by receiving GUI screen information (e.g., a screen image), and such a model 181 may be built, for example, by training GUI screen samples given design pattern information (i.e., correct answers/labels).

In the present exemplary embodiments, the producing device 10 may predict the design patterns 183 and 185 of the GUI screens (e.g., 182 and 184) through the trained model 181. For example, if the model 181 is a CNN-based model configured to receive a GUI screen image and output a confidence score for each design pattern, the producing device 10 may predict the type of design pattern by inputting the images of the target GUI screens (e.g., 182 and 184) to the trained model 181 (e.g., predict as the design pattern with the highest confidence score).

In some other exemplary embodiments, the design pattern of the target GUI screen may be determined by analyzing the image of the target GUI screen through an image processing technique.

In some still other exemplary embodiments, the design pattern of the target GUI screen may also be determined based on various combinations of the above-described exemplary embodiments.

In step S172, a recommended motion for the target object may be determined based on the determined task and design pattern. However, a specific method thereof may vary depending on the exemplary embodiments.

In some exemplary embodiments, the producing device 10 may select a GUI screen sample having the same or similar task among pre-produced GUI screen samples as a reference sample. Alternatively, the producing device 10 may select a GUI screen sample having the same or similar design pattern as a reference sample. In addition, the producing device 10 may determine the recommended motion of the target object using a motion object of the reference sample.

Figure 19:
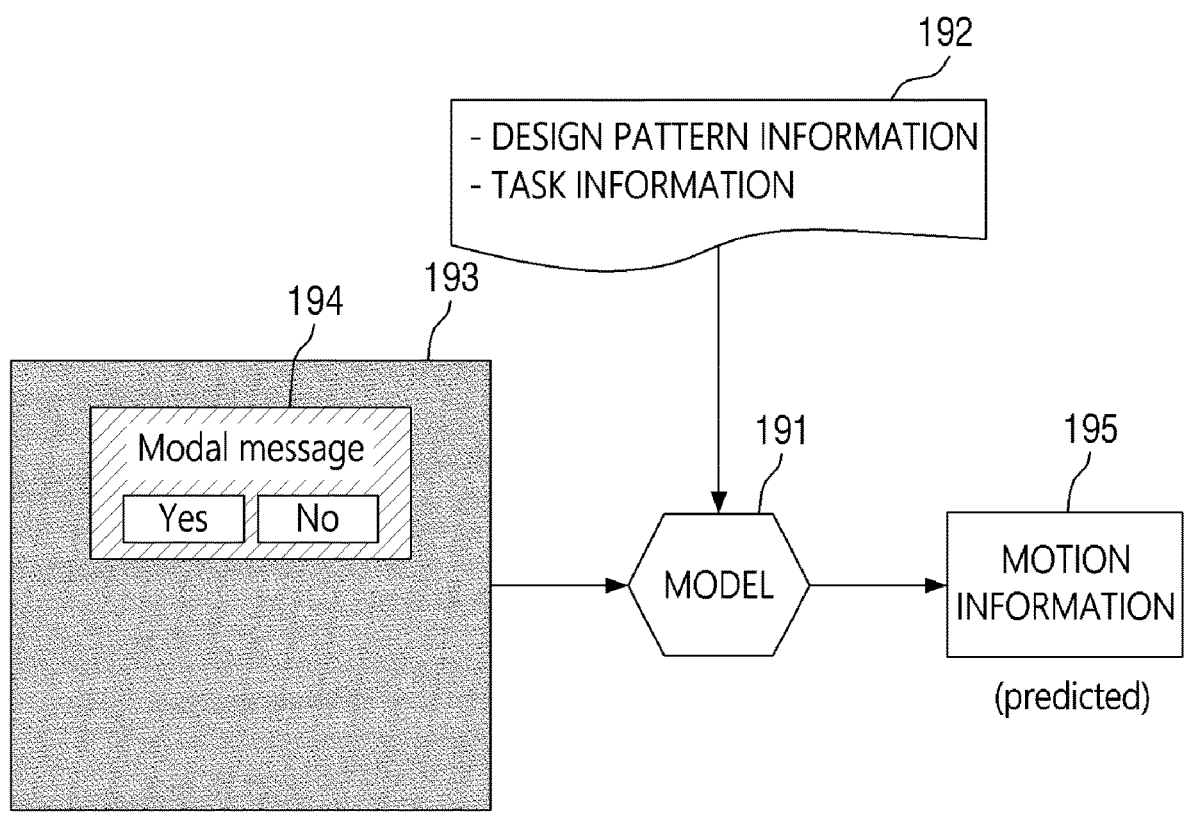
FIG. 19 is an exemplary diagram for explaining a method for predicting a recommended motion of a target object according to a design pattern and/or a task of a GUI screen using a machine learning model according to some still other exemplary embodiments of the present disclosure.

In some other exemplary embodiments, as illustrated in FIG. 19, recommended motion information 195 for the target object 194 may be predicted through a trained model 191. Specifically, the model 191 may be trained to predict the motion information 195 by further receiving design pattern and/or task information 192 (see the description of FIG. 13). The model 191 trained in this way may predict the recommended motion information 195 by further considering the design pattern and/or task of the target GUI screen 193. In some cases, the producing device 10 may select a model corresponding to the design pattern and/or task of the target GUI screen 193 among a plurality of models, and may predict the recommended motion information of the target object 194 using the selected model (see the description of FIG. 14).

In some still other exemplary embodiments, the recommended motion for the target object may also be determined based on various combinations of the above-described exemplary embodiments.

So far, the method for producing the prototype of the GUI according to some other exemplary embodiments of the present disclosure has been described with reference to FIGS. 17 to 19. As described above, by determining the recommended motion of the target object in consideration of the task and the design pattern of the target GUI screen, recommendation accuracy and user satisfaction may be further improved.

Hereinafter, a method for producing a prototype of a GUI according to some still other exemplary embodiments of the present disclosure will be described with reference to FIGS. 20 to 23.

Figure 20:
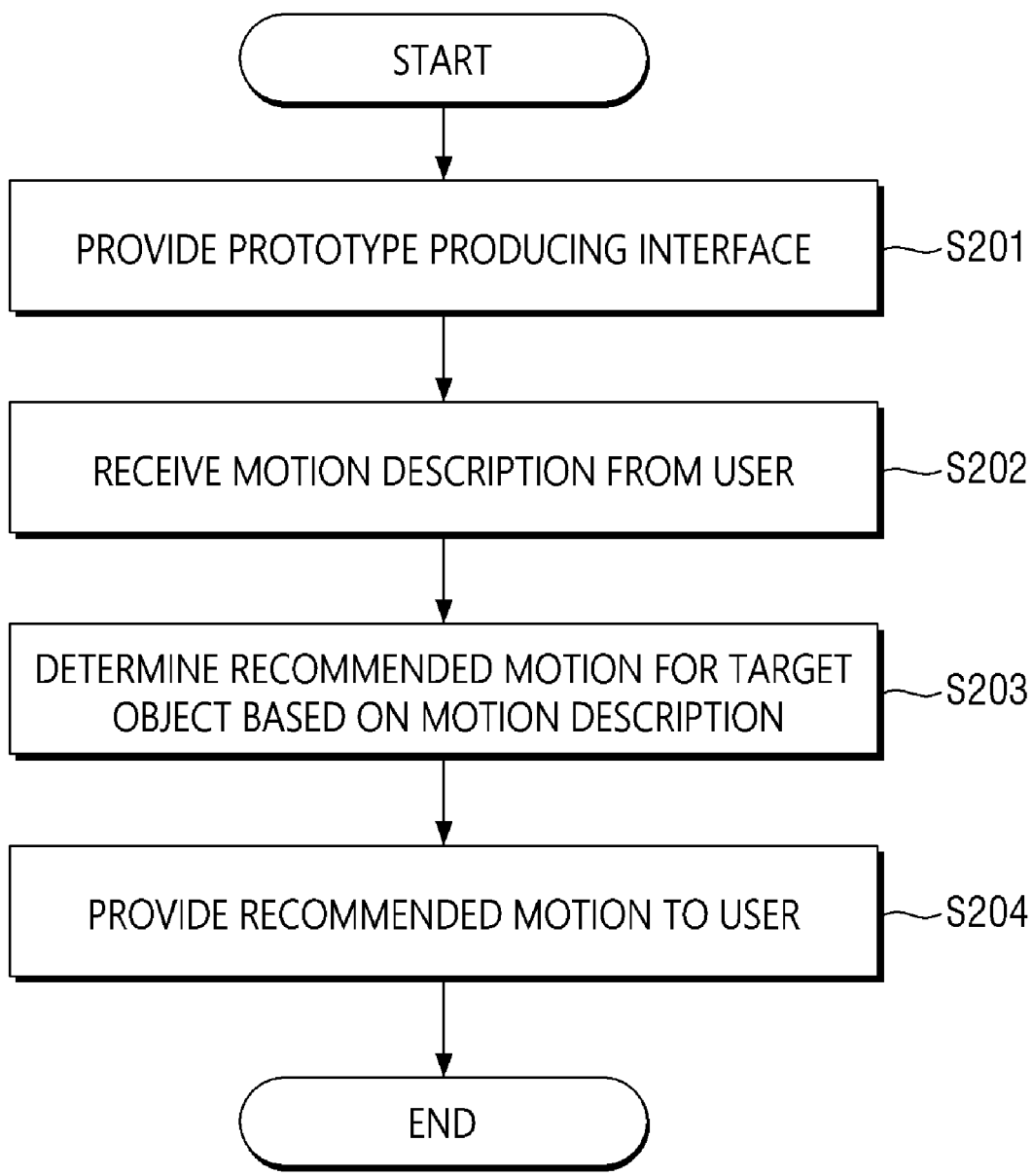
FIG. 20 is an exemplary flowchart schematically illustrating a method for producing a prototype of a GUI according to some still other exemplary embodiments of the present disclosure.

FIG. 20 is an exemplary flowchart schematically illustrating a method for producing a prototype of a GUI according to some still other exemplary embodiments of the present disclosure. However, this is only a preferred exemplary embodiment for achieving the object of the present disclosure, and some steps may also be added or deleted as needed.

As illustrated in FIG. 20, the present exemplary embodiments relate to a method for determining a recommended motion for a target object in consideration of a design intention, an image, and the like contained in a motion description of a user.

Here, the motion description may refer to a description of a motion desired by the user. The motion description may include, for example, an image to be expressed (transmitted) through a motion (e.g., a rough feeling of motion) or design intention, a specific description of motion, constraints on motion, etc., but the scope of the present disclosure is not limited thereto.

The present exemplary embodiments may also start at step S201 of providing a prototype producing interface.

In step S202, a motion description may be received from the user. Any method of receiving the motion description may be used. For example, the producing device 10 may also receive a motion description in the form of text through a keyboard or the like or may also receive motion description in the form of voice through a microphone or the like. Alternatively, the producing device 10 may also receive a video or gesture based motion description through a camera or the like. The received motion description may be converted into data (e.g., text) in a form that is easy to analyze through an appropriate recognition technique (e.g., voice recognition, gesture recognition, etc.).

In some exemplary embodiments, in order to obtain a more accurate motion description, the producing device 10 may provide selectable options to the user. For example, the producing device 10 may provide predefined options to more accurately grasp a user's desired motion image or a user's design intention, and determine the motion description (or design intention, image, etc.) based on the option selected by the user. In this case, the options may also be predefined for each task of the GUI screen (e.g., if the task of the GUI screen is to provide error information, 'light warning', 'heavy warning', etc. may be provided as options).

Various examples of the motion description refer to Table 1 below.

TABLE 1

| Motion Description | Move slowly then move quickly |
|---|---|
| | Appears quickly and then disappears softly |
| | Bouncing up and down |
| | Getting faster or slower |
| | Feeling of moving heavy object |
| | Light warning |

In step S203, a recommended motion for a target object may be determined based on the motion description. For example, the producing device 10 may analyze the motion description to extract a user's design intention, motion pattern, and the like, and determine a recommended motion based on the extraction result. However, a specific method thereof may vary depending on the exemplary embodiments.

In some exemplary embodiments, the producing device 10 may extract the user's design intention from the motion description through a text analysis technique (e.g., part-of-speech analysis, object name recognition, etc.). In addition, the producing device 10 may determine a motion pattern corresponding to the corresponding design intention among a plurality of predefined motion patterns and determine the recommended motion based on the determined motion pattern. Types of design intention may be predefined, and a correspondence relationship between the design intention and the motion patterns may also be predefined.

In some other exemplary embodiments, the producing device 10 may extract the user's design intention (or motion pattern, etc.) from the motion description through a text analysis technique. Next, the producing device 10 may select a GUI sample having the same or similar design intention (or motion pattern, etc.) as a reference sample among the pre-produced GUI samples. In addition, the producing device 10 may determine the recommended motion for the target object using a motion object of the reference sample.

Figure 21:
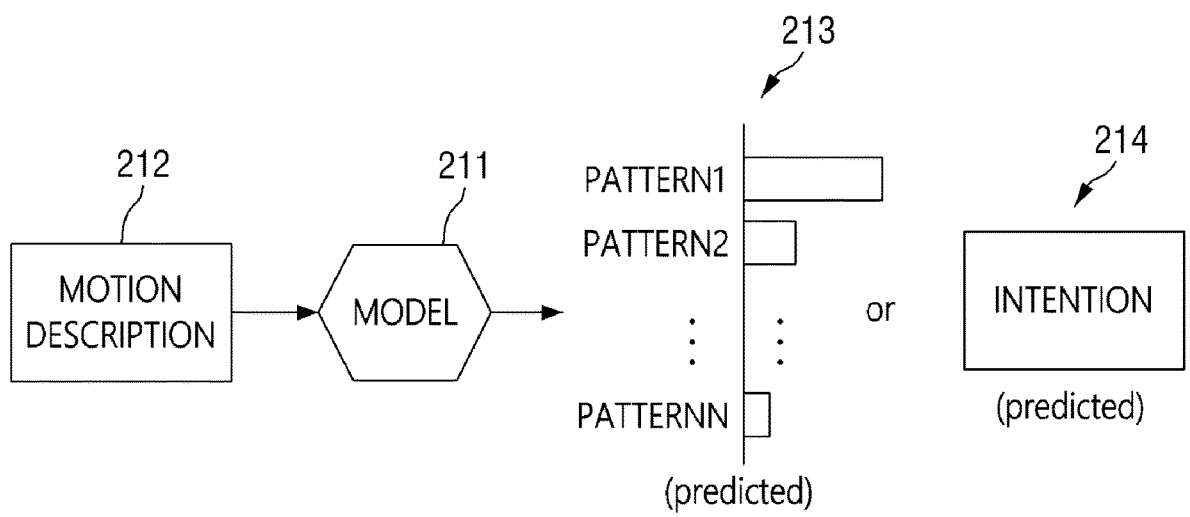
FIGS. 21 and 22 are exemplary diagrams for explaining a method for extracting a user's design intention (or intent) from a motion description using a machine learning model according to some exemplary embodiments of the present disclosure.

In some still other exemplary embodiments, as illustrated in FIG. 21, a user's design intention 214 (or motion pattern, etc.) may be predicted through a trained model 211. Specifically, the model 211 may be trained to predict the design intention 214 and/or motion pattern (e.g., may be configured to output a confidence score 213 for each motion pattern) by receiving a motion description 212 in the form of text. Such a model 211 may be built by training motion description samples given design intention (or motion pattern) information. According to the present exemplary embodiments, the user's design intention, the motion pattern to be expressed by the user, and the like may be accurately predicted using the trained model 211.

Figure 22:
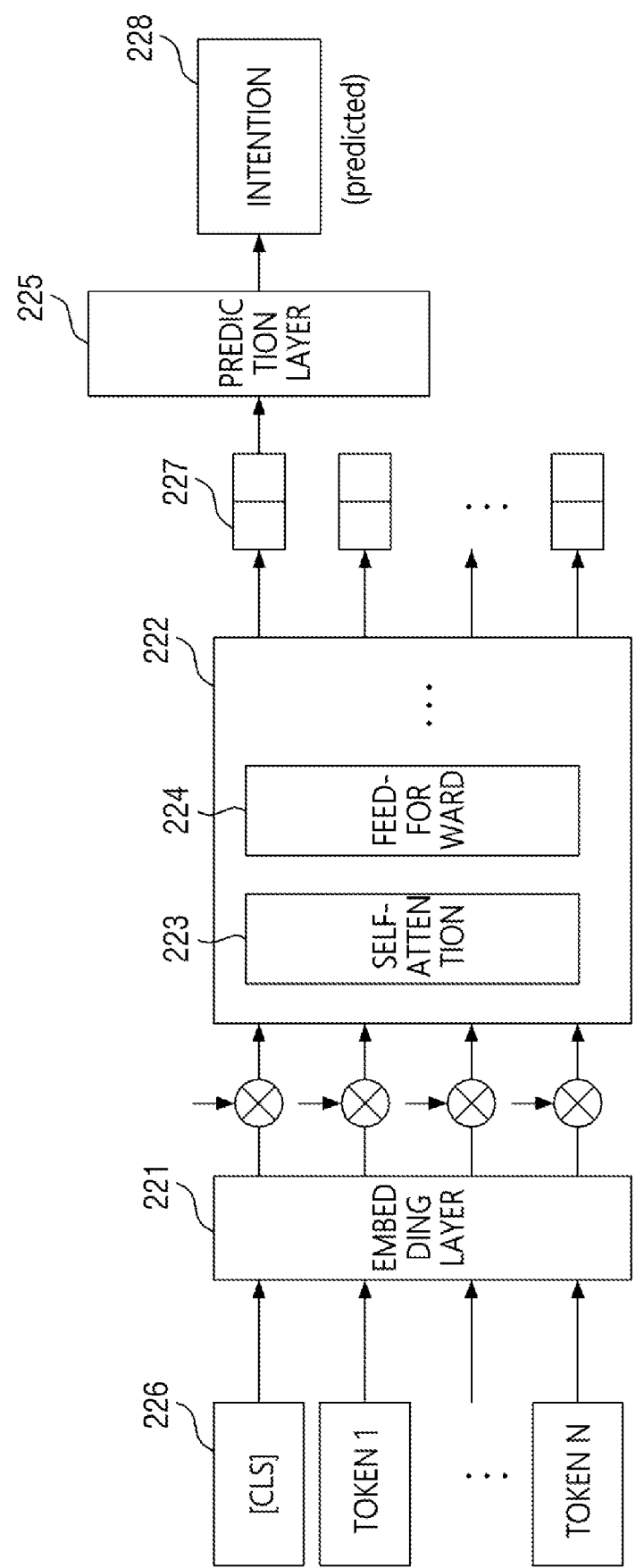

An exemplary detailed structure of the model 211 is illustrated in FIG. 22.

As illustrated in FIG. 22, the model 211 may include an embedding layer 221, an encoder 222, and a prediction layer 225. In some cases, the model 211 may further include other layers or may be configured in a form in which some layers are omitted.

The embedding layer 221 may generate an embedding for each of tokens constituting the motion description. For example, the embedding layer 221 may receive a one-hot vector of a token and generate an embedding of the corresponding token. In addition, the embedding layer 221 may further receive a predefined special token 226 (e.g., CLS token). A final embedding 227 for the special token 226 may be used as an embedding representing the motion description. A function of the CLS token is already known to those skilled in the art, and thus a description thereof will be omitted. The embedding layer 221 may be implemented as a neural network layer such as a fully-connected layer or MLP, for example, but the scope of the present disclosure is not limited thereto.

Next, the encoder 222 may encode the input embeddings (information) to generate (output) embeddings (e.g., 227) in token units. The encoder 222 may include a self-attention layer 223 and a feed-forward layer 224. For these, the description of FIG. 6 will be referred to.

Next, the prediction layer 225 may predict a design intention 228 (or motion pattern) by receiving the representative embedding (e.g., 227) of the motion description. In other words, the prediction layer 225 may output a confidence score for the design intention (or motion pattern) by receiving the representative embedding (e.g., 227). Here, the representative embedding 227 may be an embedding corresponding to the special token 226 or an embedding calculated by aggregating (e.g., averaging, etc.) the embeddings in token units. The prediction layer 225 may be implemented as a neural network layer (e.g., fully-connected layer, MLP, etc.) that performs multi-classification, but the scope of the present disclosure is not limited thereto.

Figure 23:
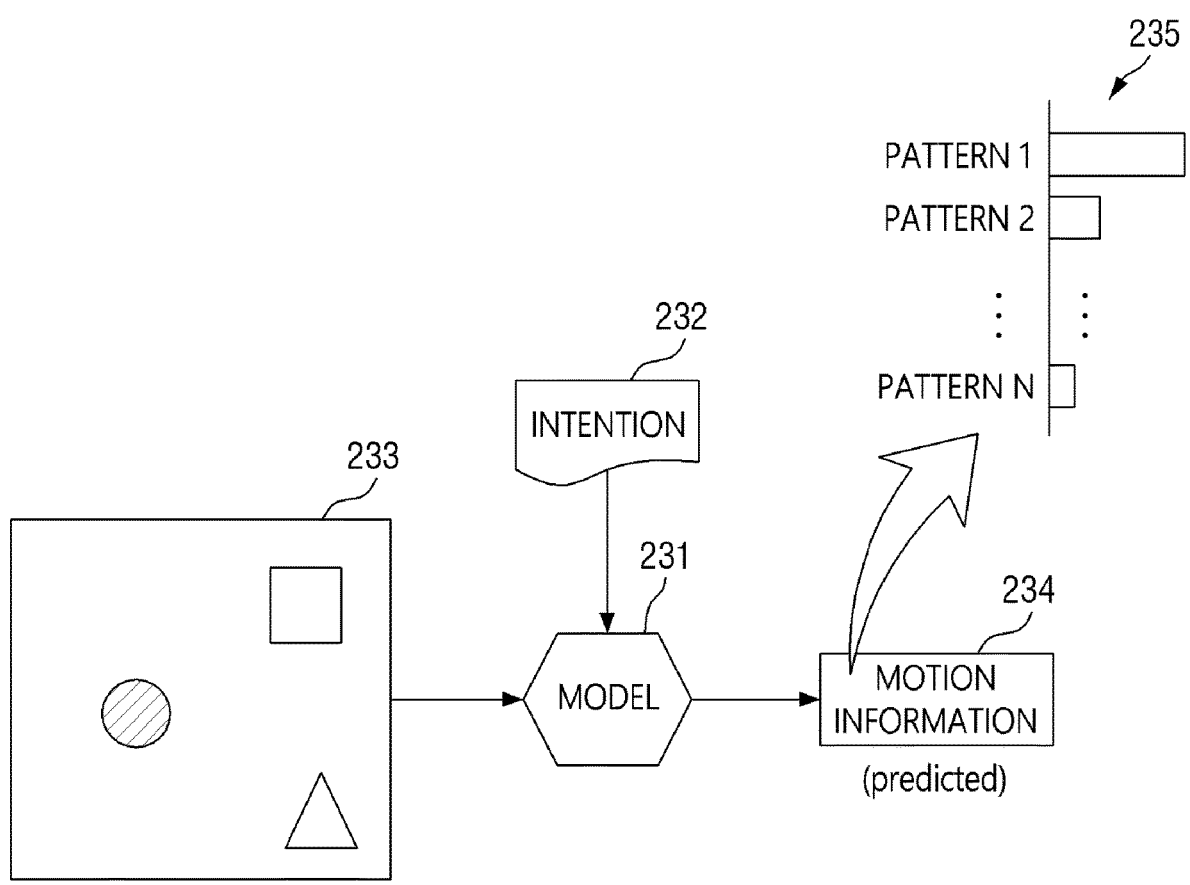
FIG. 23 is an exemplary diagram for explaining a method for predicting a recommended motion of a target object according to a design intention of a GUI screen using a machine learning model according to some exemplary embodiments of the present disclosure.

In some still other exemplary embodiments, as illustrated in FIG. 23, recommended motion information 234 of the target object (i.e., motion information that meets the user's design intention) may be predicted using a model 231 trained to further receive the design intention 232 and predict motion information 234 (e.g., see a motion pattern 235). For example, the producing device 10 may predict the recommended motion information 234 that meets the user's design intention 232 by inputting the information of the target GUI screen 233 and the design intention 232 into the trained model 231. Such a model 231 may be built by training the GUI screen samples given the design intention information and the motion information.

In some still other exemplary embodiments, the recommended motion for the target object may also be determined based on various combinations of the above-described exemplary embodiments.

The description will be provided with reference to FIG. 20 again.

In step S204, the recommended motion may be provided to the user.

So far, the method for producing the prototype of the GUI according to some still other exemplary embodiments of the present disclosure has been described with reference to FIGS. 20 to 23. As described above, the recommended motion for the target object may be determined by reflecting the motion description input by the user. For example, if a brief description of the motion is given, a recommended motion that meets the given description may be accurately determined using a trained model or the like. Accordingly, the production convenience of the prototype of the GUI may be further improved and the production difficulty thereof may be further reduced.

Hereinafter, a method for producing a prototype of a GUI according to some still other exemplary embodiments of the present disclosure will be described with reference to FIGS. 24 to 26.

Figure 24:
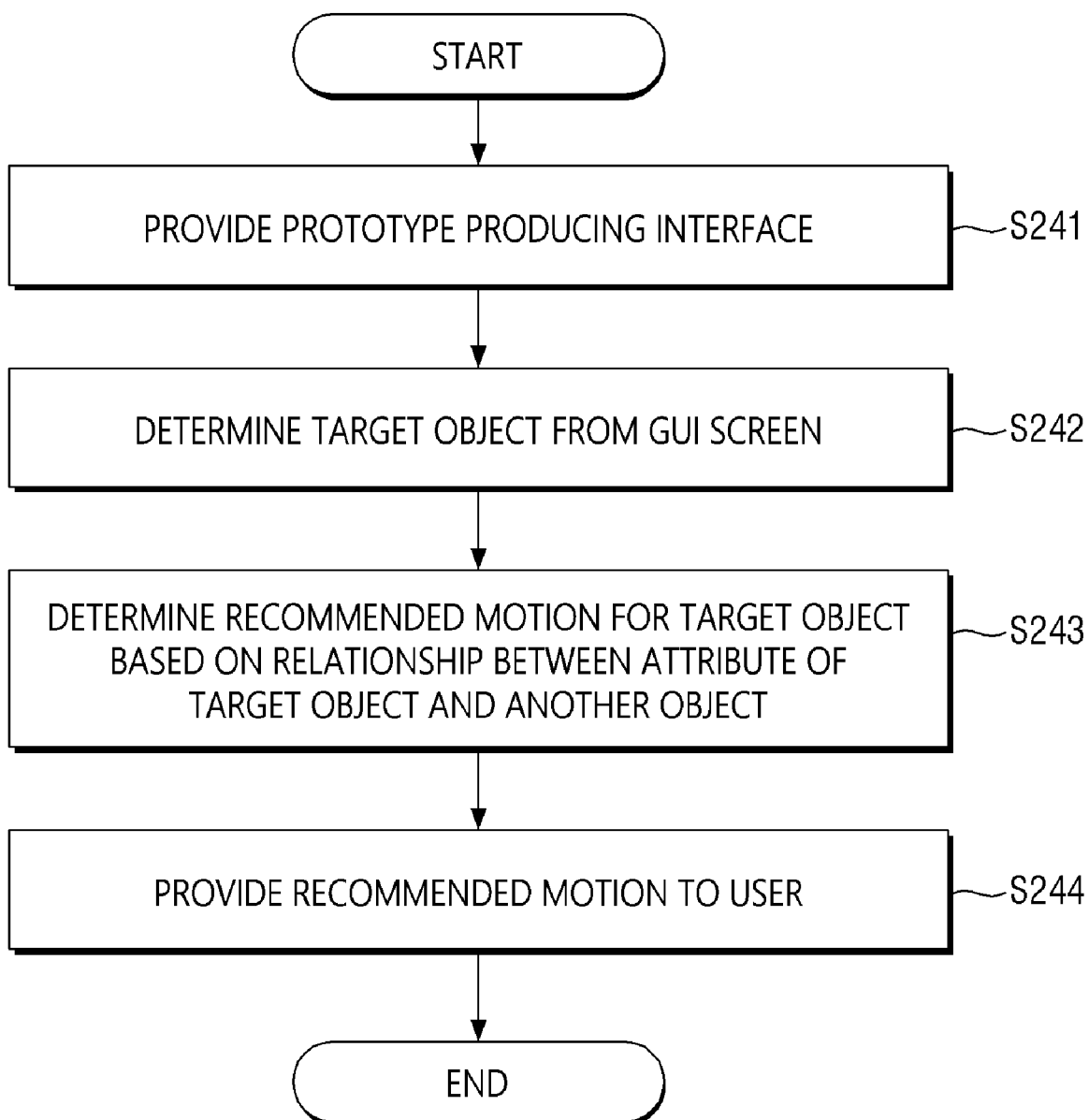
FIG. 24 is an exemplary flowchart schematically illustrating a method for producing a prototype of a GUI according to some still other exemplary embodiments of the present disclosure.

FIG. 24 is an exemplary flowchart schematically illustrating a method for producing a prototype of a GUI according to some still other exemplary embodiments of the present disclosure. However, this is only a preferred exemplary embodiment for achieving the object of the present disclosure, and some steps may also be added or deleted as needed.

As illustrated in FIG. 24, the present exemplary embodiments relate to a method for determining a recommended motion for a target object in consideration of attribute information of the target object and relationship information between the target object and other objects.

The present exemplary embodiments may start at step S241 of providing a prototype producing interface.

In step S242, a target object may be determined from among one or more objects disposed on the target GUI screen.

In step S243, a recommended motion for the target object may be determined based on attribute information of the target object and/or relationship information between the target object and other objects. However, a specific method thereof may vary depending on the exemplary embodiments.

Figure 25:
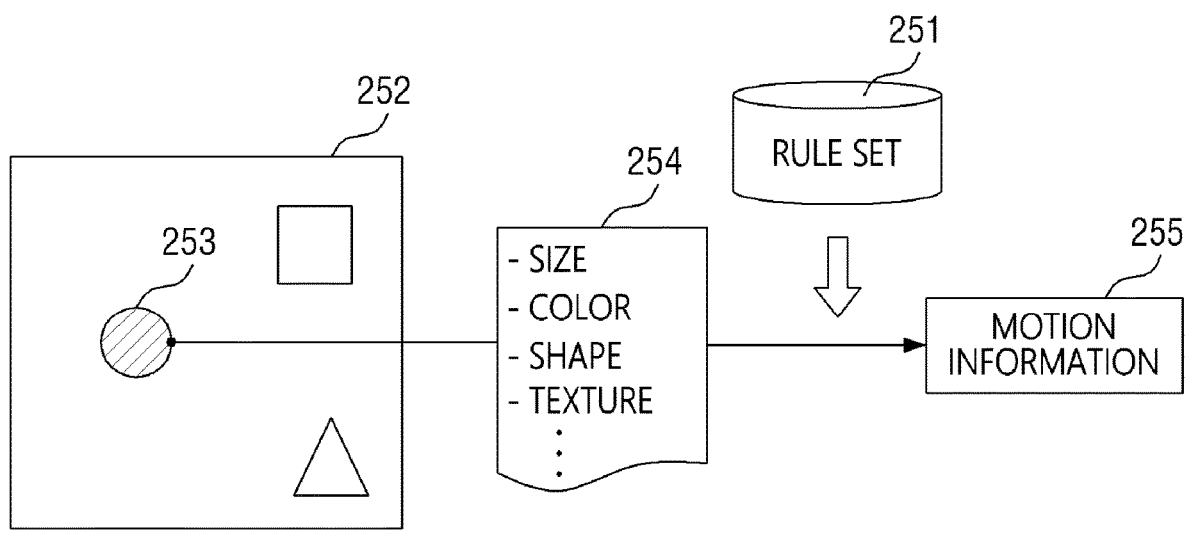
FIG. 25 is an exemplary diagram for explaining a method for determining a recommended motion based on attribute information of a target object according to some exemplary embodiments of the present disclosure.

In some exemplary embodiments, as illustrated in FIG. 25, recommended motion information 255 of a target object 253 may be determined using a rule set 251 defined to determine a motion based on an attribute of an object. Specifically, the rule set 251 may include a plurality of rules defined based on a correlation between the attributes of objects and the motion. The correlation between the attributes of the objects and the motion may be defined, for example, as illustrated in Table 2 below, but the scope of the present disclosure is not limited thereto. In addition, various rules may be derived from Table 2 below. Examples of the rules may include a rule for lowering speed or acceleration when a size (or specific gravity) of an object is equal to or greater than a reference value, a rule for determining a value (or range of value) of speed or acceleration according to the size (or specific gravity) of the object, a rule for increasing the speed or acceleration when a color of the object is warm, a rule for increasing the speed or acceleration when a shape of the object is circular, and the like. However, the scope of the present disclosure is not limited thereto. In the present exemplary embodiments, the producing device 10 may determine the recommended motion information 255 by applying the rule set 251 to the attribute information 254 of the target object 253 disposed on the target GUI screen 252.

TABLE 2

| Attributes | Correlation with Motion |
|---|---|
| Size (Specific Gravity) | The larger the size (specific gravity), the slower the speed |
| Color | The warmer (hotter) the color of the object the faster the speed |
| | A warm-colored object has a faster speed than a cool-colored object |
| Form (Shape) | The closer the shape of the object is to the circular shape, the faster the speed. |
| | A circular object has a faster speed than a rectangular object |
| | A vertically long object has a faster rotational speed than a horizontally long object |
| Texture | The smoother the texture, the faster the speed |
| | A smooth textured object has a faster speed than a rough (or sticky) textured object |
| | An object with a smooth (or bouncy) texture bounces well |

Figure 26:
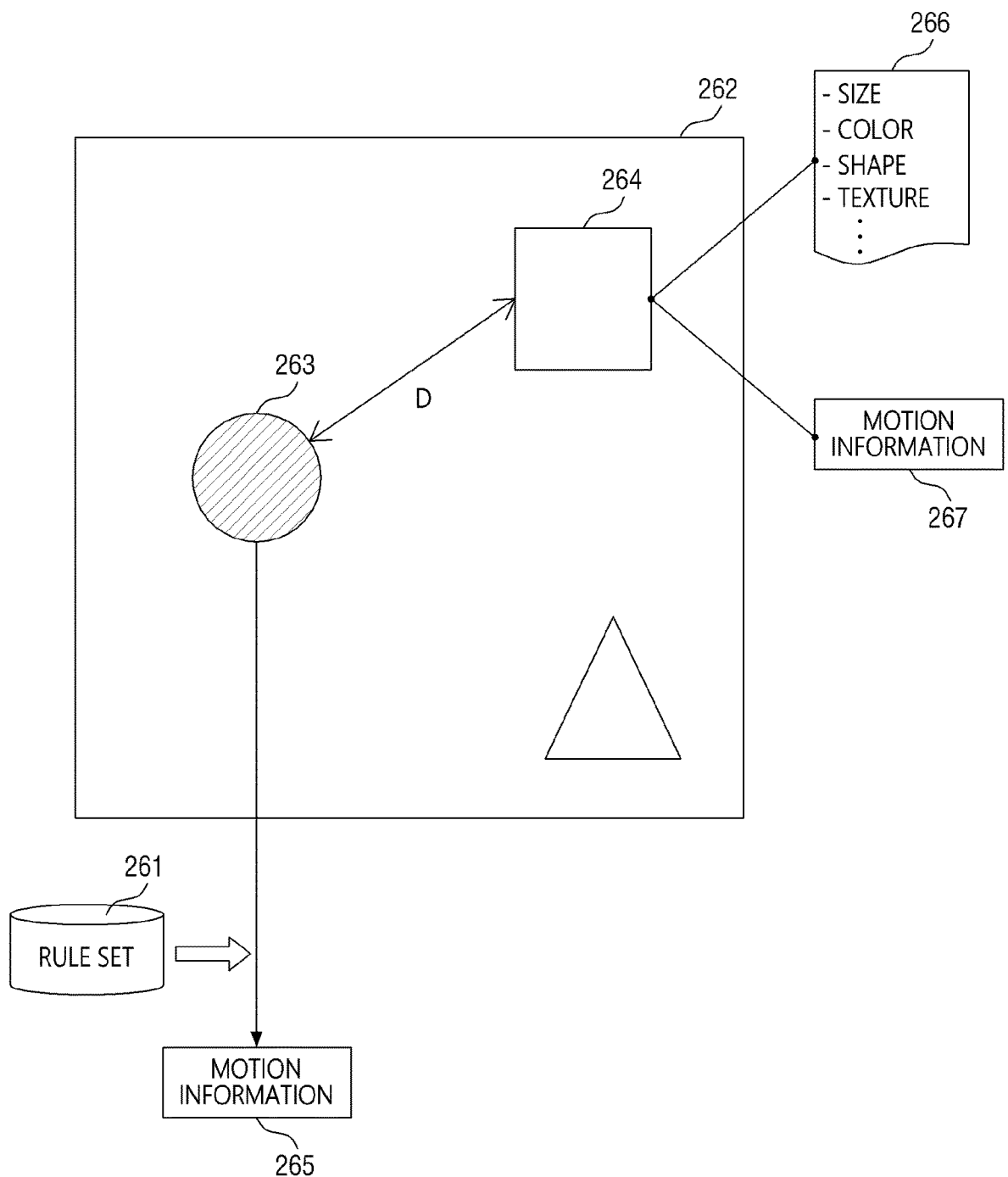
FIG. 26 is an exemplary diagram for explaining a method for determining a recommended motion based on relation information between a target object and another object according to some exemplary embodiments of the present disclosure.

In some exemplary embodiments, as illustrated in FIG. 26, recommended motion information 266 of a target object 263 may be determined using a rule set 261 defined to determine a motion based on the relationship of the objects. Specifically, the rule set 261 may include a plurality of rules defined based on a correlation between a relationship of objects in the same screen and a motion. The correlation may be defined, for example, as illustrated in Table 3 below, but the scope of the present disclosure is not limited thereto. In addition, various rules may be derived from Table 3 below. Examples of the rules may include a rule for lowering a speed or acceleration when a distance between the objects is equal to or smaller than a reference value, a rule for adjusting a speed or acceleration based on a relative size between the objects, and the like. However, the scope of the present disclosure is not limited thereto. In the present exemplary embodiments, the producing device 10 may determine the recommended motion information 265 by applying an appropriate rule set 261 according to the relation information (e.g., distance D, relative size, etc.) between the target object 263 disposed on the target GUI screen 262 and other objects 264. In this case, the producing device 10 may derive the relation information using attribute information (266, e.g., size, position, etc.) of other objects 264 and may determine the recommended motion information 265 of the target object 263 by referring to motion information 267 (e.g., speed, etc.) of other objects 264.

TABLE 3

| Relationship with Other Objects in the Same Screen | Correlation with Motion |
|---|---|
| Relative Size (Specific Gravity) | A speed of a large object is relatively slower than that of a small object |
| Distance | Slows down when distance is close to avoid colliding |

TABLE 3-continued

| Relationship with Other Objects in the Same Screen | Correlation with Motion |
| --- | --- |
| Form (Shape) | A circular object has a faster speed than a rectangular object<br>A vertically long object has a faster rotational speed than a horizontally long object |
| Position or Layer Relationship | A motion of an upper object is greater than a motion of a lower object |

In some other exemplary embodiments, according to the exemplary embodiments described with reference to FIGS. 4 to 23, the recommended motion information (i.e., motion element value) of the target object may be determined, and according to the previous exemplary embodiments, the recommended motion information may be corrected (or adjusted) based on the rule set (e.g., 251 and 261). For example, the producing device 10 may determine a speed value of the target object through the trained model, and may correct (or adjust) the speed value by applying the rule set (e.g., 251) related to the attributes (e.g., size, shape, etc.) of the target object. By doing so, the recommended motion of the target object may be more accurately determined.

In some still other exemplary embodiments, the recommended motion for the target object may also be determined based on various combinations of the above-described exemplary embodiments.

The description will be provided with reference to FIG. 24 again.

In step S244, the recommended motion may be provided to the user.

So far, the method for producing the prototype of the GUI according to some still other exemplary embodiments of the present disclosure has been described with reference to FIGS. 24 to 26. As described above, a natural motion suitable for a situation may be determined as the recommended motion of the target object by considering a relationship between attribute information of the target object and other objects (e.g., a case in which a high-speed motion is recommended for a target object having a large size may be prevented).

Hereinafter, a method for producing a prototype of a GUI according to some still other exemplary embodiments of the present disclosure will be described with reference to FIGS. 27 to 31.

Figure 27:
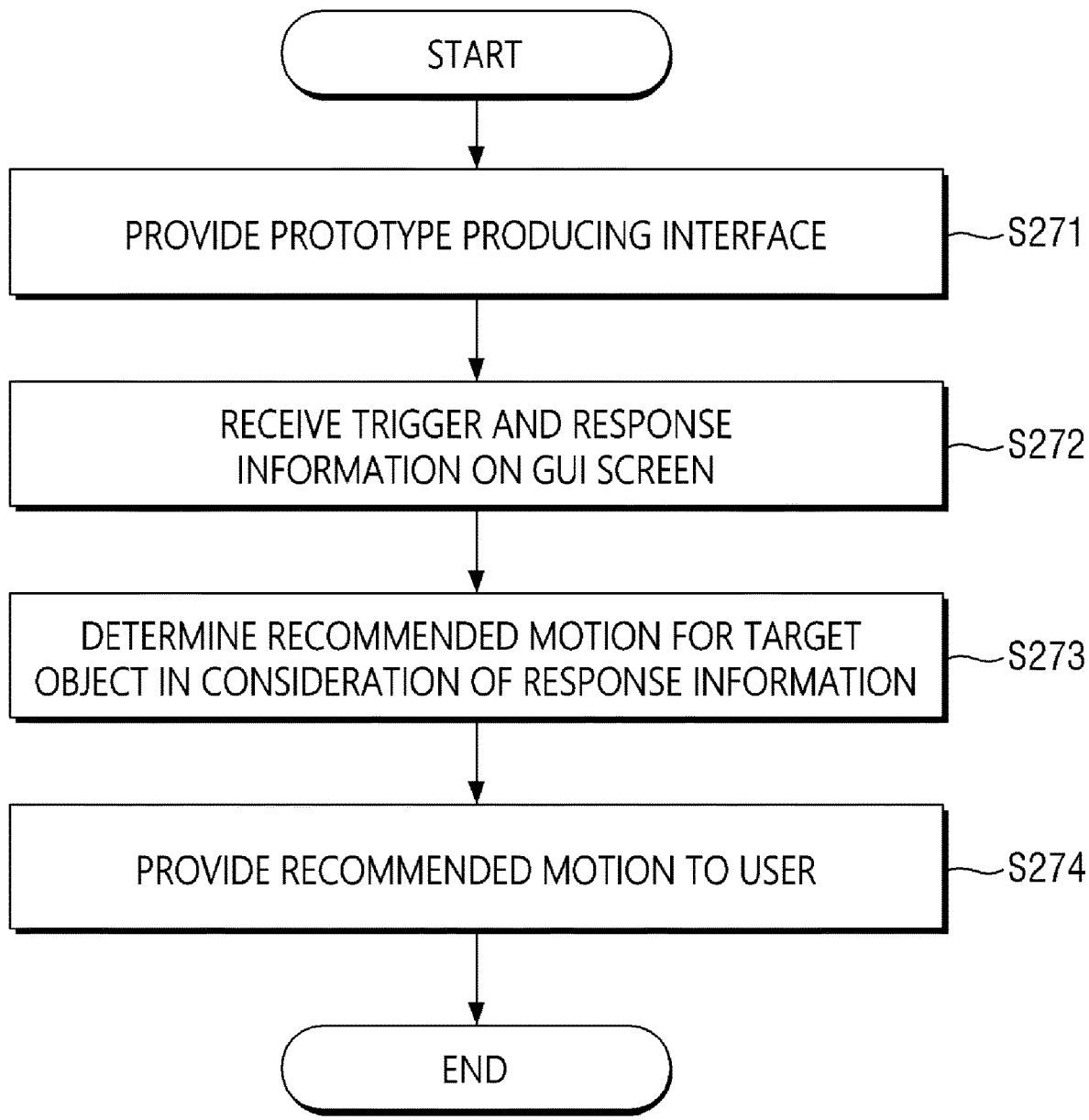
FIG. 27 is an exemplary flowchart schematically illustrating a method for producing a prototype of a GUI according to some still other exemplary embodiments of the present disclosure.

FIG. 27 is an exemplary flowchart schematically illustrating a method for producing a prototype of a GUI according to some still other exemplary embodiments of the present disclosure. However, this is only a preferred exemplary embodiment for achieving the object of the present disclosure, and some steps may also be added or deleted as needed.

As illustrated in FIG. 27, the present exemplary embodiments relate to a method for determining a recommended motion for a target object by considering a response set on the GUI screen or using a plurality of GUI screens in which a change in display attribute exists.

The present exemplary embodiments may also start at step S271 of providing a prototype producing interface.

In step S272, trigger and response information for the GUI screen may be input (set) by the user. In some cases, the producing device 10 may load GUI prototypes (or GUI screens) in which the trigger and responses are set. That is, the producing device 10 may obtain the GUI screens on which the trigger and response are set from other devices (e.g., 11 in FIG. 1) or the user.

Alternatively, the producing device 10 may receive a plurality of GUI screens in which a change in display attribute (e.g., a display attribute of the GUI screen, a display attribute of an object) exists. In this case, the producing device 10 may compare the received GUI screens to identify the type of changed display attribute, the degree of change, a pattern of change, a continuity of change, and the like. In this case, the target GUI screen may be a GUI screen before or after the display attribute is changed. In the following description, the identified information is collectively referred to as 'response information'.

Figure 28:
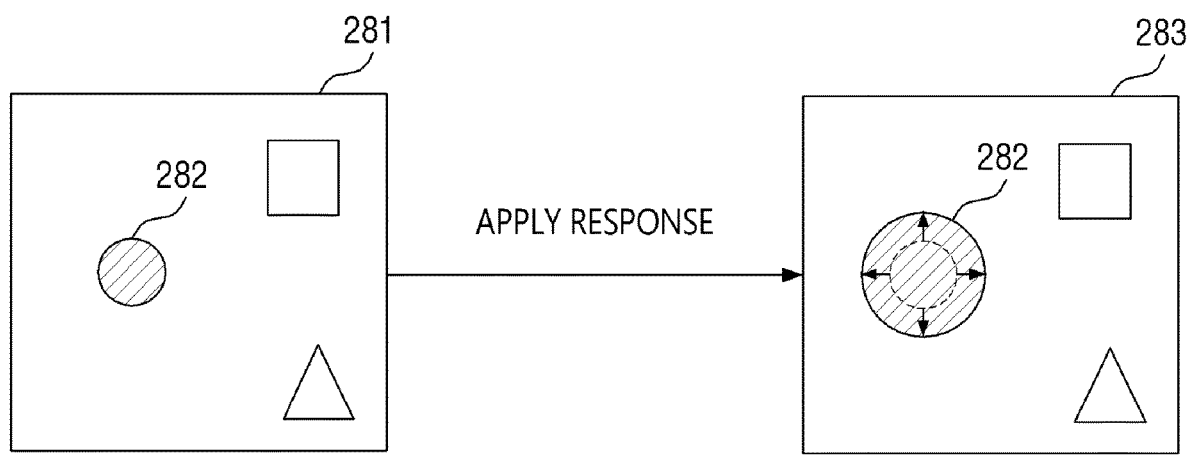
FIGS. 28 and 29 illustrate GUI screens before and after applying a response that may be referred to in the method for producing a prototype of a GUI according to some other exemplary embodiments.
Figure 29:
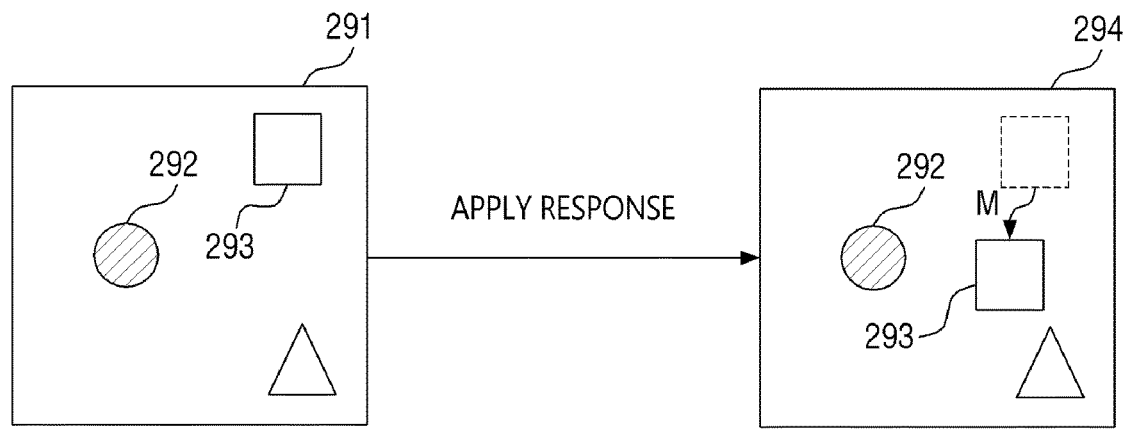

FIGS. 28 and 29 illustrate GUI screens 281, 283, 291, and 294 on which responses are set. FIG. 28 illustrates a case in which a response causing a size expansion is set in a target object 282, and FIG. 29 illustrates a case in which a response for inducing a motion is set in another object 293 instead of a target object 292.

In step S273, a recommended motion for a target object may be determined based on the response information. For example, the producing device 10 may determine the recommended motion of the target object based on the type (kind) and degree of change in the display attribute caused by the response. However, a specific method thereof may vary depending on the exemplary embodiments.

In some exemplary embodiments, the producing device 10 may select a GUI screen sample having the same or similar response set as a reference sample from among pre-produced GUI screen samples. In addition, the producing device 10 may determine the recommended motion of the target object using a motion object of the reference sample.

Figure 30:
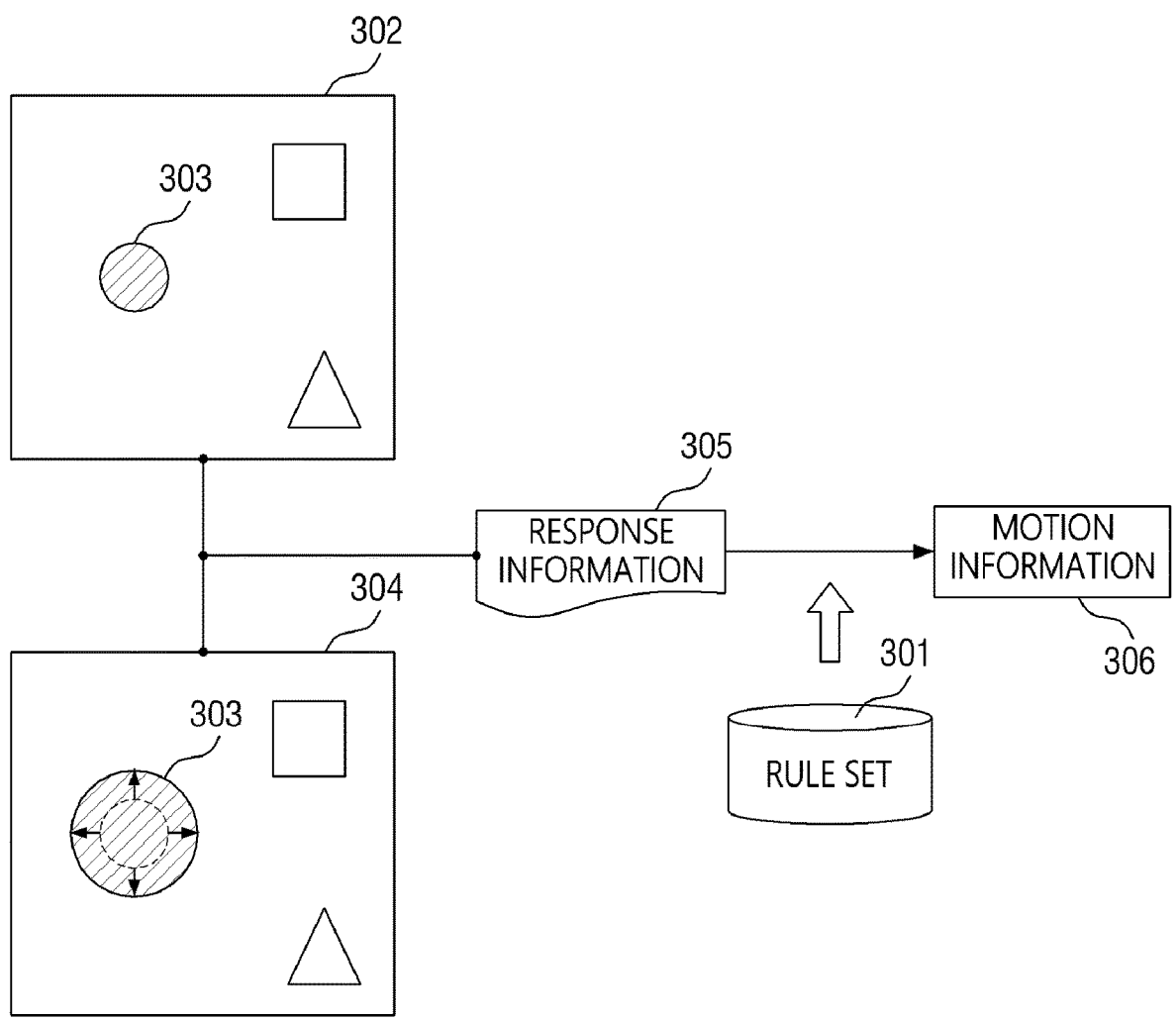
FIG. 30 is an exemplary diagram for explaining a method for determining a recommended motion based on response information according to some exemplary embodiments of the present disclosure.

In some exemplary embodiments, as illustrated in FIG. 30, recommended motion information 306 of a target object 303 may be determined using a rule set 301 defined to determine a motion based on the response information (e.g., the type of display attribute being changed, the degree of change, etc.). Specifically, the rule set 301 may include a plurality of rules defined based on a correlation between the response information and the motion. The correlation may be defined, for example, as illustrated in Table 4 below, but the scope of the present disclosure is not limited thereto. In addition, various rules may be derived from Table 4 below. Examples of the rules may include a rule for increasing a speed or acceleration when a size change of the object is equal to or greater than a reference value, a rule for increasing a speed or acceleration when a color change of the object is equal to or greater than a reference value, and the like. However, the scope of the present disclosure is not limited thereto. In the present exemplary embodiments, the producing device 10 may determine the recommended motion information 306 by applying the rule set 301 to the response information 305 of the target object 303 (or another object).

TABLE 4

| Display Attributes | Correlation with Motion |
| --- | --- |
| Size (Specific Gravity) | The greater the size change, the faster the speed |
| Position | The greater the position change, the faster the speed |
| Color | The greater the color change, the faster the speed |
| Direction | The greater the direction change, the faster the speed |

TABLE 4-continued

| Display Attributes | Correlation with Motion |
| --- | --- |
| Transparency | The greater the transparency change, the faster the speed |
|  | The greater the transparency, the faster the speed |
| Rotation | The greater the rotation angle, the faster the speed |

In some other exemplary embodiments, according to the exemplary embodiments described with reference to FIGS. 4 to 26, the recommended motion information (i.e., motion element value) of the target object may be determined, and according to the previous exemplary embodiments, the recommended motion information may be corrected based on the rule set 301.

Figure 31:
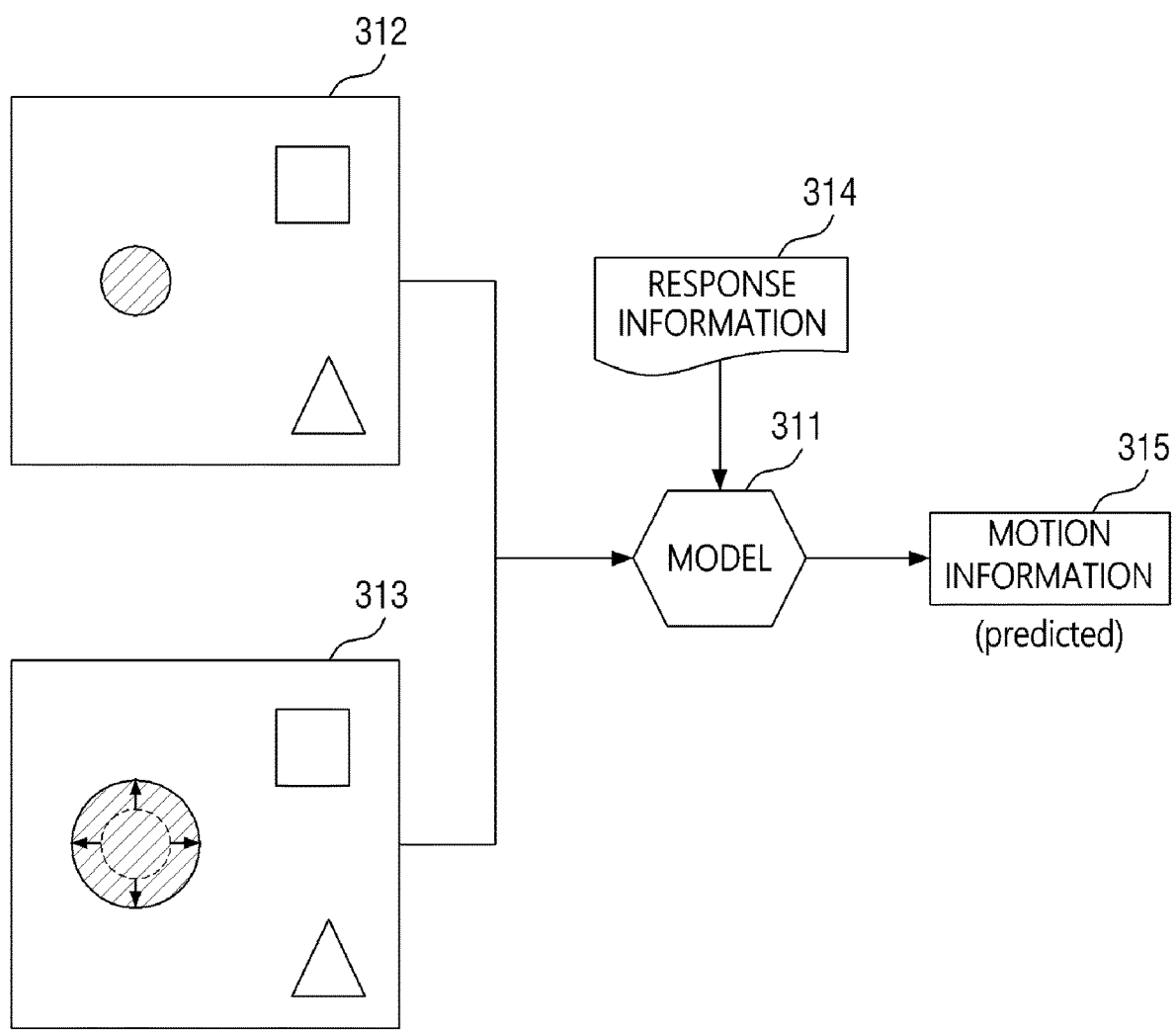
FIG. 31 is an exemplary diagram for explaining a method for determining a recommended motion based on response information according to some other exemplary embodiments of the present disclosure.

In some still other exemplary embodiments, as illustrated in FIG. 31, recommended motion information 315 of the target object may be predicted by using a model 311 trained to predict the motion information 315 by further receiving response information 314. For example, the producing device 10 may predict the recommended motion information 315 of the target object by inputting information of the associated GUI screens 312 and 313 and the response information 314 to the trained model 311. Such a model 311 may be built by training the GUI screen samples given the response information.

The description will be provided with reference to FIG. 27 again.

In step S274, the recommended motion may be provided to the user.

So far, the method for producing the prototype of the GUI according to some still other exemplary embodiments of the present disclosure has been described with reference to FIGS. 27 to 31. As described above, a natural motion suitable for a situation may be determined as the recommended motion of the target object by taking into account changes in display attributes of the target object or other objects (e.g., a case in which a low-speed motion is recommended for a target object having a large size change may be prevented).

So far, various exemplary embodiments of the method for producing the prototype of the GUI have been described with reference to FIGS. 4 to 31. Various exemplary embodiments described above may be combined in various forms. For example, the producing device 10 may determine a value of a first motion element of the target object using the trained model (e.g., 101) and may determine a value of a second motion element of the target object using the rule set (e.g., 251).

Hereinafter, an exemplary computing device 320 capable of implementing the producing device 10 according to some exemplary embodiments of the present disclosure will be described with reference to FIG. 32.

FIG. 32 is an exemplary hardware configuration diagram illustrating the computing device 320.

As illustrated in FIG. 32, the computing device 320 may include one or more processors 321, a bus 323, a communication interface 324, a memory 322 for loading a computer program executed by the processor 321, and a storage 325 for storing the computer program 326. However, only the components related to the exemplary embodiments of the present disclosure are illustrated in FIG. 32. Therefore, those skilled in the art to which the present disclosure belongs may know that other general-purpose components may be further included in addition to the components illustrated in FIG. 32. That is, the computing device 320 may further include various components other than the components illustrated in FIG. 32. In addition, in some cases, the computing device 320 may also be configured in a form in which some of the components illustrated in FIG. 32 are omitted. Hereinafter, each component of the computing device 320 will be described.

The processor 321 may control an overall operation of each component of the computing device 320. The processor 321 may include at least one of a central processing unit (CPU), a micro processor unit (MPU), a micro controller unit (MCU), a graphic processing unit (GPU), a neural processing unit (NPU), or any type of processor well known in the art of the present disclosure. In addition, the processor 321 may perform a calculation on at least one application or program for executing the operations/methods according to the exemplary embodiments of the present disclosure. The computing device 320 may include one or more processors.

Next, the memory 322 stores various data, commands, and/or information. The memory 322 may load the computer program 326 from the storage 325 to execute the operations/methods according to the exemplary embodiments of the present disclosure. The memory 322 may be implemented as a volatile memory such as RAM, but the technical scope of the present disclosure is not limited thereto.

Next, the bus 323 may provide a communications function between the components of the computing device 320. The bus 323 may be implemented as various types of buses, such as an address bus, a data bus, and a control bus.

Next, the communication interface 324 supports wired/wireless Internet communications of the computing device 320. In addition, the communication interface 324 may also support various communication methods other than Internet communications. To this end, the communication interface 324 may include a communication module well known in the art of the present disclosure.

Next, the storage 325 may non-temporarily store one or more computer programs 326. The storage 325 may include a non-volatile memory such as a read only memory (ROM), an erasable programmable ROM (EPROM), an electrically erasable programmable ROM (EEPROM), a flash memory, or the like, a hard disk, a removable disk, or any form of computer-readable recording medium well known in the art to which the present disclosure pertains.

Next, the computer program 326 may include one or more instructions that when loaded into memory 322, cause the processor 321 to perform the operations/methods according to various exemplary embodiments of the present disclosure. That is, the processor 321 may perform the operations/methods according to various exemplary embodiments of the present disclosure by executing the one or more instructions.

For example, the computer program 326 may include one or more instructions that perform an operation of providing a prototype producing interface to a user, an operation of determining a target object from among one or more objects disposed on a target GUI screen produced through a prototype producing interface, an operation of determining a recommended motion for the target object using pre-produced GUI screen samples, and an operation of providing the recommended motion to the user. In this case, the producing device 10 according to some exemplary embodiments of the present disclosure may be implemented through the computing device 320.

Meanwhile, in some exemplary embodiments, the computing device 320 illustrated in FIG. 32 may also refer to a virtual machine implemented based on cloud technology. For example, the computing device 320 may be a virtual machine operating on one or more physical servers included in a server farm. In this case, at least some of the processor 321, the memory 322, and the storage 325 illustrated in FIG. 32 may be virtual hardware, and the communication interface 324 may also be implemented as a virtualized networking element such as a virtual switch.

So far, the exemplary computing device 320 capable of implementing the producing device 10 according to some exemplary embodiments of the present disclosure has been described with reference to FIG. 32.

So far, various exemplary embodiments of the present disclosure and effects according to the exemplary embodiments have been described with reference to FIGS. 1 to 32. Effects according to the technical idea of the present disclosure are not limited to the effects mentioned above, and other effects that are not mentioned may be obviously understood by those skilled in the art from the following description.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the preferred embodiments without substantially departing from the principles of the present disclosure. Therefore, the disclosed preferred embodiments of the disclosure are used in a generic and descriptive sense only and not for purposes of limitation.

What is claimed is:

1. A method for producing a prototype of a graphical user interface, performed by at least one computing device, the method comprising:
   providing a prototype producing interface to a user;
   determining a target object from among one or more objects disposed on a target graphical user interface (GUI) screen produced through the prototype producing interface;
   calculating a visual similarity between pre-produced GUI screen samples and the target GUI screen, wherein the GUI screen samples include motion objects;
   selecting a GUI screen sample that the visual similarity is equal to or greater than a reference value among the pre-produced GUI screen samples as a reference GUI screen sample; and
   determining a recommended motion for the target object using a motion object of the reference GUI screen sample;
   providing the recommended motion to the user;
   updating the target GUI screen by reflecting the recommended motion on the target GUI screen in response to an input from the user accepting the recommended motion;
   obtaining a rule set for determining a motion based on an attribute of a specific object; and
   determining another recommended motion of the target object by applying the rule set to attribute information of the target object,
   wherein the rule set comprises at least one of:
   a first rule for lowering a speed or an acceleration of the specific object when a size of the specific object is equal to or greater than a reference value,
   a second rule for adjusting the speed or acceleration of the specific object based on a color of the specific object, and
   a third rule for adjusting the speed or acceleration of the specific object based on a shape of the specific object.

2. The method of claim 1, wherein the determining of the target object comprises:
   obtaining a deep learning model trained to predict whether an object class is a motion object class by receiving GUI screen information;
   predicting an object belong to the motion object class from among the one or more objects disposed on the target GUI screen through the trained deep learning model; and
   determining the predicted object through the trained model as the target object.

3. The method of claim 2, wherein the deep learning model is a convolutional neural network (CNN) based model trained to predict the motion object class by receiving a GUI screen image.

4. The method of claim 2, wherein the GUI screen information comprises attribute information of a specific object, and
   the deep learning model comprises:
   an encoder for generating an embedding corresponding to the specific object by receiving the attribute information of the specific object, and
   a prediction layer that predicts whether a class of the specific object is the motion object class based on the generated embedding, wherein the prediction layer is implemented based on a neural net layer.

5. The method of claim 1, wherein the determining of the recommended motion for the target object comprises determining a value of a motion element for the recommended motion, and
   the motion element includes at least one of a destination, a travel time to the destination, a speed, and an acceleration.

6. The method of claim 1, wherein the visual similarity is calculated based on display attribute information of an object and display attribute information of a GUI screen, and
   the display attribute information of the GUI screen comprises a number of objects.

7. The method of claim 1, wherein the determining of the recommended motion for the target object comprises:
   calculating an embedding similarity between embeddings of the GUI screen samples and an embedding of the target GUI screen, wherein the embeddings of the GUI screen samples and the embedding of the target GUI screen are generated through a trained deep learning model; and selecting the GUI screen reference sample from among the GUI screen samples further based on the embedding similarity.

8. The method of claim 1, wherein the determining of the recommended motion for the target object comprises:
obtaining a trained deep learning model using the GUI screen samples, wherein the deep learning model is trained to predict a motion of a specific object by receiving information of the GUI screen samples; and
predicting the recommended motion by inputting information of the target GUI screen to the trained deep learning model.

9. The method of claim 8, wherein the deep learning model comprises a plurality of prediction layers that predict values of different motion elements of the specific object,
the plurality of prediction layers are implemented based on a neural net layer, and
the motion elements comprise at least one of a destination, a travel time to the destination, a speed, and an acceleration.

10. The method of claim 8, wherein the information of the GUI screen samples comprises attribute information of the specific object, and
the deep learning model comprises:
an encoder for generating an embedding corresponding to the specific object by receiving the attribute information of the specific object, and
a prediction layer that predicts motion information of the specific object based on the generated embedding.

11. The method of claim 1, wherein the determining of the recommended motion for the target object comprises:
selecting a reference GUI screen sample from among the GUI screen samples further based on a task or a design pattern of the target GUI screen.

12. The method of claim 1, further comprising:
receiving a motion description of the target object from the user;
extracting a user's design intention from the motion description;
obtaining a trained deep learning model using the GUI screen samples, wherein the deep learning model is trained to predict a motion of an object by receiving a design intention of the GUI screen samples; and
predicting another recommended motion of the target object that meets the user's design intention through the trained deep learning model.

13. The method of claim 1, wherein the determining of the recommended motion for the target object comprises:
determining a value of a motion element of the target object using the motion object of the reference GUI screen sample; and
determining the recommended motion by adjusting the value of the motion element based on attribute information of the target object.

14. The method of claim 1, further comprising:
obtaining a rule set for determining a motion based on a relationship between objects;
extracting relationship information between the target object and another object disposed on the target GUI screen by analyzing the target GUI screen; and
determining another recommended motion by applying the rule set to the extracted relationship information.

15. The method of claim 14, wherein the rule set comprises at least one of:

a first rule for lowering a speed or acceleration when a distance between objects is equal to or less than a reference value, and
a second rule for adjusting the speed or acceleration based on a relative size between the objects.

16. The method of claim 1, further comprising:
obtaining another GUI screen associated with the target GUI screen, wherein a change in display attribute exists between the another GUI screen and the target GUI screen;
identifying a type and degree of change of the display attribute by comparing the target GUI screen with the another GUI screens; and
determining another recommended motion of the target object based on the identification result.

17. The method of claim 1, wherein the providing of the recommended motion to the user comprises:
displaying an image of the recommended motion through a preview window;
displaying a value of a motion element for the recommended motion; and
updating the image of the recommended motion by reflecting a changed value in response to an input from the user for changing the value of the motion element.

18. A system for producing a prototype of a graphical user interface, the system comprising:
one or more processors; and
a memory for storing instructions,
wherein the one or more processors, by executing the stored instructions, perform operations comprising:
providing a prototype producing interface to a user;
determining a target object from among one or more objects disposed on a graphical user interface (GUI) screen produced through the prototype producing interface;
calculating a visual similarity between pre-produced GUI screen samples and the target GUI screen, wherein the GUI screen samples include motion objects;
selecting a GUI screen sample that the visual similarity is equal to or greater than a reference value among the pre-produced GUI screen samples as a reference GUI screen sample; and
determining a recommended motion for the target object a motion object of the reference GUI screen sample;
providing the recommended motion to the user;
updating the target GUI screen by reflecting the recommended motion on the target GUI screen in response to an input from the user accepting the recommended motion;
obtaining a rule set for determining a motion based on an attribute of a specific object; and
determining another recommended motion of the target object by applying the rule set to attribute information of the target object,
wherein the rule set comprises at least one of:
a first rule for lowering a speed or an acceleration of the specific object when a size of the specific object is equal to or greater than a reference value,
a second rule for adjusting the speed or acceleration of the specific object based on a color of the specific object, and
a third rule for adjusting the speed or acceleration of the specific object based on a shape of the specific object.

* * * * *